United States Patent
Murabayashi

(10) Patent No.: US 8,577,207 B2
(45) Date of Patent: Nov. 5, 2013

(54) INFORMATION SIGNAL PROCESSING APPARATUS AND METHOD, INFORMATION SIGNAL PROCESSING SYSTEM AND METHOD, AND INFORMATION SIGNAL PLAYBACK APPARATUS AND METHOD

(75) Inventor: Noboru Murabayashi, Saitama (JP)

(73) Assignee: Sony Corporation, Tokyo (JP)

( * ) Notice: Subject to any disclaimer, the term of this patent is extended or adjusted under 35 U.S.C. 154(b) by 931 days.

(21) Appl. No.: 12/647,912

(22) Filed: Dec. 28, 2009

(65) Prior Publication Data

US 2010/0098393 A1    Apr. 22, 2010

Related U.S. Application Data

(62) Division of application No. 10/920,681, filed on Aug. 18, 2004, now Pat. No. 7,664,376.

(30) Foreign Application Priority Data

Aug. 20, 2003    (JP) .................................. 2003-296329

(51) Int. Cl.
    *H04N 5/84*    (2006.01)
    *H04N 5/89*    (2006.01)

(52) U.S. Cl.
    USPC ........................................ 386/335; 386/336

(58) Field of Classification Search
    USPC .................. 386/248, 332–336, 353
    See application file for complete search history.

(56) References Cited

U.S. PATENT DOCUMENTS

| | | | |
|---|---|---|---|
| 5,913,010 A | 6/1999 | Kaneshige et al. | |
| 6,580,870 B1 * | 6/2003 | Kanazawa et al. | 386/240 |
| 7,274,860 B2 * | 9/2007 | Okada et al. | 386/248 |

FOREIGN PATENT DOCUMENTS

| | | |
|---|---|---|
| JP | 2000 285243 | 10/2000 |
| JP | 2000 299829 | 10/2000 |
| JP | 2002 259720 | 9/2002 |
| JP | 2003 101939 | 4/2003 |

\* cited by examiner

*Primary Examiner* — Thai Tran
*Assistant Examiner* — Nigar Chowdhury
(74) *Attorney, Agent, or Firm* — Frommer Lawrence & Haug LLP; William S. Frommer; Paul A. Levy

(57) ABSTRACT

An information signal processing apparatus comprises: data playback unit for playing back data from a recording medium on which featured data is recorded according to the setting of a first parameter series; information file playback unit for playing back the video/audio information files by selecting from the recording medium; parameter setting unit for selecting one of the played back information files and setting parameter data corresponding to the information file and to the first or second parameter series; playback period processing unit for determining the playback period of the video/audio data recorded on the recording medium according to the featured data and either initialization parameter data set in advance in accordance with the first and second parameter series or the parameter data adjusted by the parameter setting unit; and playback control unit for performing playback control according to the signal from the playback period processing unit.

16 Claims, 26 Drawing Sheets

FIG. 2A

```
80   120  200  V
200  330  210  V
400  550  180  NV
700  1000 300  NV
1200 1250 220  V
1500 1550 150  V
1700 1990 240  V
2300 2800 210  NV
              ↑ AUDIO TYPE
         ↑ AVERAGE POWER
    ↑ END FRAME
↑ START FRAME
```

AUDIO FEATURED DATA FILE

FIG. 2B

```
410  500  3  200
700  900  3  300
1500 1600 3  230
              ↑ NUMBER OF DETECTIONS
         ↑ AREA
    ↑ END FRAME
↑ START FRAME
```

TELOP FEATURED DATA FILE

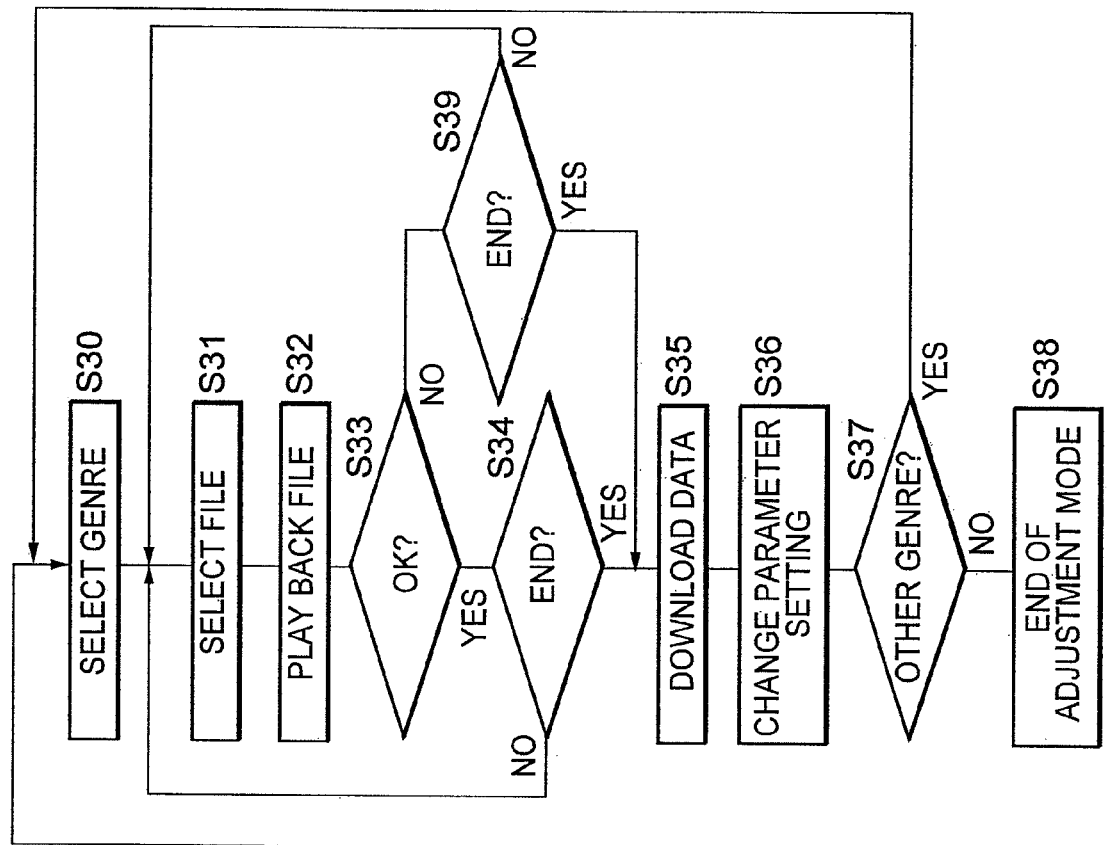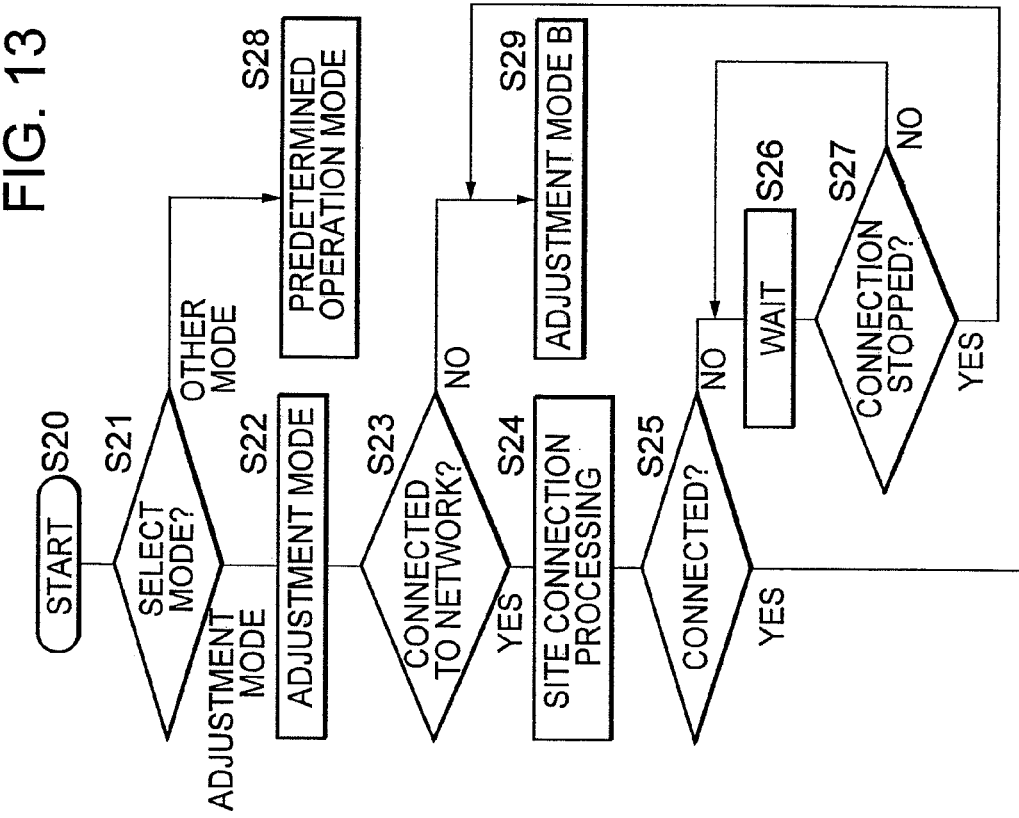
FIG. 13

FIG. 25A

| 1a | 2a | 3a | 4a | 5a |
|----|----|----|----|----|
| 6a | 7a | 8a | 9a | 10a |
| 11a | 12a | 13a | 14a | 15a |
| 16a | 17a | 18a | 19a | 20a |
| 21a | 22a | 23a | 24a | 25a |

FIG. 25B

| 1a | 2b | 3b | 4b | 5b |
|----|----|----|----|----|

FIG. 25C

| 1c | 2c | 3c |
|----|----|----|
| 4c | 5c | 6c |
| 7c | 8c | 9c |

INFORMATION SIGNAL PROCESSING APPARATUS AND METHOD, INFORMATION SIGNAL PROCESSING SYSTEM AND METHOD, AND INFORMATION SIGNAL PLAYBACK APPARATUS AND METHOD

This is a division of application Ser. No. 10/920,681, filed Aug. 18, 2004 now U.S. Pat. No. 7,664,376, which is entitled to the priority filing date of Japanese application 2003-296329 filed on Aug. 20, 2003, the entirety of which is incorporated herein by reference.

BACKGROUND OF THE INVENTION

1. Field of the Invention

The present invention relates to a technology for special effect playback processing and special effect recording processing, such as digest playback and recording, on a recording/playback apparatus that records and plays back information signals, such as video signals and audio signals used in a broadcast program and the like, to and from a predetermined recording medium such as a magneto optical disc, hard disk drive (HDD), and a semiconductor memory. The present invention relates also to a signal processing technology for extracting predetermined featured data from image data and classifying predetermined images using the feature extraction data and predetermined parameter data that are set when the information is transmitted on a predetermined network such as the Internet.

2. Description of the Related Art

When recorded contents recorded for a long time are played back with a conventional VTR or a disc recording/playback apparatus within a shorter time for quickly understanding their content, the playback processing is performed about 1.5 to 2 times faster than the normal playback processing speed considering the speed at which audio information can comprehended.

If an attempt is made to play back the content in a farther shorter time to play back its summary (digest playback), the audio output is too fast to comprehend its content. Therefore, the playback processing is usually performed by outputting only the image without audio sound.

One of the methods for solving this problem is to perform the digest playback in which the predetermined featured data is extracted from the recorded video/audio data, and only the predetermined featured periods are selected and played back according to a predetermined rule, or in which only the predetermined featured periods are selected and played back according to a predetermined rule using predetermined parameter data.

A technology for playing back a video using the featured data is to analyze the video structure by detecting featured data from vide/audio data and then play back the summary by carrying out similar chain detection as disclosed, for example, in Japanese Laid-Open Patent JP2000-285243A.

Furthermore, a technology for detecting a music period from audio signals, which is a technology for browsing a video by detecting audio feature, is described, for example, in Kenichi Minami, et al., "Video Indexing Using Music Information and Its Application" (Collective Papers from The Institute of Electronics, Information and Communication Engineers) (D-2 Vol. J81-D-2 No. 3 pp. 529-537, March, 1998) and Kenichi Minami et al., "Video Browsing Interface Using Audio Information" (Technical Reports from The Institute of Image Information and Television Engineers (Vol. 19, No. 7, pp. 1-6, 1995)).

A technology for skimming through a video from a predetermined image segment or a predetermined audio segment is also known. For example, the technology is found in Japanese Patent Application No. Hei 8-513478 "Method And Apparatus for Creating Searchable Digital Video Library And System And Method for Using The Library" and Japanese Patent Application No. Hei 8-513479 "Method And System for Skimming through Digital Audio And Video Data".

In addition, it is also possible to classify TV programs or image scenes recorded by a video camera according to similar images for use in editing or in playing back the digest of only the classified image scenes.

For the classifying processing, Japanese Laid-Open Patent JP2002-344872A and Japanese Laid-Open Patent JP2002-344852A disclose a technology for carrying out a predetermined similar image classification according to predetermined featured data and a predetermined threshold and a technology for displaying image data classified according to similarities in a predetermined format.

Depending upon the result of image classification, the desired classifying method may differ according to the user. For example, one user wants to change the classifying method, another user wants to extend the allowable range of similarities for similarity-based classification, and still another user wants to narrow the allowable range. See, for example, Patent Document 1: Japanese Laid-Open Patent JP2002-281449A.

SUMMARY OF THE INVENTION

However, when a user records a program genre of a broadcast program and carries out its digest playback, there is a case in which a period that the user expects is not played back or a period that the user wants to skip is played back. In such a case, the only solution is to make a cumbersome adjustment, for example, the user is required to change the parameter setting each time when the digest is played back.

Another problem is that, when a user wants to change the result of the classifying processing, the user cannot easily understand how the classifying processing will be affected by a change in the threshold value that is used as the parameter. This makes the adjustment more cumbersome.

In view of the foregoing, the present invention provides a technology for allowing many users to process many program genres, and to adjust parameters for playing back a digest as effectively and efficiently as possible. In addition, the present invention provides a user, who wants to adjust the result of image classification, with a technology for allowing the user to easily adjust parameters and to perform a desired image classification without carrying out a complicate adjustment.

An information signal processing apparatus of the present invention comprises: data playback means for playing back various types of data from a recording medium, on which featured data is recorded in a predetermined recording area on the recording medium and also video/audio data is recorded together with the predetermined featured data extracted from the predetermined video/audio data, image data, or audio data according to the setting of a predetermined first parameter series; a predetermined recording medium to record predetermined video/audio information files to which the predetermined feature extraction processing and a predetermined playback period selection processing using the featured data extracted by setting a predetermined second parameter series are carried out; information file playback means for playing back the predetermined video/audio information files by selecting from the recording medium; parameter setting means for selecting one of the played back information files and setting predetermined parameter data corresponding to the information file and to the first or second parameter series, as predetermined playback processing adjustment parameters; playback period processing means for determining, according to a predetermined rule, the predetermined playback period of the video/audio data recorded on the recording medium according to the featured data and either initialization parameter data that is set in advance in accordance with the first and second parameter series or the parameter data adjusted by the parameter setting means; and playback control means for performing predetermined playback control according to a signal from the playback period processing means.

In the information signal processing apparatus as described above, the featured data extraction is performed for data generated by bandwidth-compressing the video/audio data. In the information signal processing apparatus as described above, the video/audio information file includes at least two files according to the predetermined attribute of the video/audio information.

An information signal processing method of the present invention comprises: a first step for playing back various types of data from a recording medium on which featured data is recorded in a predetermined recording area on the recording medium and also video/audio data is recorded together with the predetermined featured data extracted from the predetermined video/audio data, image data, or audio data according to the setting of a predetermined first parameter series; a second step for recording predetermined video/audio information files to which the predetermined feature extraction processing and a predetermined playback period selection processing using the featured data extracted by setting a predetermined second parameter series are carried out; a third step for playing back the predetermined video/audio information files by selecting from the recording medium and playing them back; a fourth step for selecting one of the played back information files and setting predetermined parameter data corresponding to the information file and to the first or second parameter series, as predetermined playback processing adjustment parameters; a fifth step for determining, according to a predetermined rule, the predetermined playback period of the video/audio data recorded on the recording medium according to the featured data and either initialization parameter data that is set in advance in accordance with the first and second parameter series or the parameter data adjusted by the parameter data setting; and a sixth step for performing predetermined playback control according to a signal from the playback period processing in the fifth step.

In the information signal processing method as described above, the featured data extraction is performed for data generated by bandwidth-compressing the video/audio data. In the information signal processing method as described above, the video/audio information file includes at least two files according to the predetermined attribute of the video/audio information.

An information signal processing system of the present invention comprises: data playback means for playing back various types of data from a recording medium, on which featured data is recorded in a predetermined recording area on the recording medium and also video/audio data is recorded together with the predetermined featured data extracted from the predetermined video/audio data, or image data, or audio data; operation mode setting means for setting a predetermined operation mode via a user's predetermined input; a predetermined network connection means; a network connection adjustment means for connecting to a predetermined site via the network connection means, downloading predetermined data, and performing predetermined parameter adjustment when the predetermined operation mode is set by the operation mode setting means; digest playback period processing means for determining, according to a predetermined rule, the predetermined digest playback period of the video/audio data recorded on the recording medium according to either initialization parameter data that is set in advance or parameter data adjusted by the network connection adjustment means; and playback control means for performing predetermined playback control according to a signal from the digest playback period processing means.

The information signal processing system as described above is characterized in that predetermined test data is played back for a user to confirm adjusted condition when the predetermined parameter adjustment is performed by the network connection adjustment means. The information signal processing system as described above further comprises: setting data adjustment means for performing the adjustment without network connection by outputting information to a user via predetermined display means or information output means when the predetermined parameter adjustment cannot be performed by the network connection adjustment means. The information signal processing system as described above is characterized in that, during at least one of the parameter adjustment via the network connection adjustment means and the parameter adjustment not via the network connection adjustment means, the predetermined parameter adjustment is performed according to a program genre if the video/audio data is broadcast program data or according to the predetermined attribute information signal of the video/audio data if the video/audio data is not broadcast program data.

An information signal processing method of the present invention comprises: a first step for playing back various types of data from a recording medium, on which featured data is recorded in a predetermined recording area on the recording medium and also video/audio data is recorded together with the predetermined featured data extracted from the predetermined video/audio data, or image data, or audio data; a second step for setting a predetermined operation mode via a user's predetermined input; a third step for connecting to a predetermined site through predetermined network connection processing, downloading predetermined data, and performing predetermined parameter adjustment when the predetermined operation mode is set by the second step; a fourth step for determining, according to a predetermined rule, the predetermined digest playback period of the video/audio data recorded on the recording medium according to either initialization parameter data that is set in advance or parameter data adjusted through the network connection processing of the third step; and a fifth step for performing predetermined playback control according to the digest playback period processing of the fourth step.

The information signal processing method as described above is characterized in that predetermined test data is played back for a user to confirm adjusted condition when the predetermined parameter adjustment is performed through the network connection processing of the third step. In the information signal processing method as described above, the adjustment can be performed without network connection by outputting information to a user through predetermined display or through information output when the predetermined parameter adjustment cannot, be performed by the network connection processing of the third step. The information signal processing method as described above is characterized in that, during at least one of the parameter adjustment through the network connection processing of the third step and the parameter adjustment not via the network connection processing, the predetermined parameter adjustment is performed according to a program genre if the video/audio data is broadcast program data or according to the predetermined attribute information signal of the video/audio data when the video/audio data is not broadcast program data.

An information signal processing apparatus of the present invention comprises: data playback means for playing back various types of data from a recording medium, on which featured data is recorded in a predetermined recording area on the recording medium and also video/audio data is recorded together with the predetermined featured data extracted from the predetermined video/audio data, or image data, or audio data; test file playback means for playing back a predetermined playback video/audio test file for adjusting parameters; parameter adjustment means for adjusting predetermined initialization parameter data by playing back the playback video/audio test file via a predetermined user input; display means for displaying the result of initialization parameter data, which is adjusted by the parameter adjustment means, in a predetermined method; digest playback period processing means for determining, according to a predetermined rule, the predetermined digest playback period of the video/audio data recorded on the recording medium according to the featured data and either initialization parameter data that is set in advance or the parameter data adjusted by the parameter data adjustment means; and playback control means for performing predetermined playback control according to a signal from the digest playback period processing means.

In the information signal processing apparatus as described above, the parameter adjustment means can register/authenticate a user who performs the adjustment and perform a predetermined parameter setting change according to a predetermined user operation. In the information signal processing apparatus as described above, the parameter adjustment means allows a user to visually confirm the adjustment in a predetermined method each time a user is authenticated when the predetermined adjustment is performed. In the information signal processing apparatus as described above, the playback video/audio test file is prepared for the attribute of each video/audio and the featured data that can be used for the predetermined parameter adjustment is included. In the information signal processing apparatus as described above, the display means performs predetermined display operation using predetermined data in the playback video/audio test file for each predetermined adjustment.

An information signal processing method of the present invention comprises: a first step for playing back various types of data from a recording medium, on which featured data is recorded in a predetermined recording area on the recording medium and also video/audio data is recorded together with the predetermined featured data extracted from the predetermined video/audio data, or image data, or audio data; a second step for playing back a predetermined playback video/audio test file for adjusting parameters; a third step for adjusting predetermined initialization parameter data by playing back the playback video/audio test file via a predetermined user input; a fourth step for displaying the result of the initialization parameter data, which is adjusted by the third step, in a predetermined method; a fifth step for determining, according to a predetermined rule, the predetermined digest playback period of the video/audio data recorded on the recording medium according to the featured data and either initialization parameter data that is set in advance or the parameter data adjusted by the initialization parameter data adjusted by the third step; and a sixth step for performing predetermined playback control according to the digest playback period processing of the fifth step.

In the information signal processing method as described above, during the initialization parameter data adjustment in the third step, a user who performs the adjustment can be registered/authenticated and a predetermined parameter setting can be changed according to a predetermined user operation. In the information signal processing method as described above, during the initialization parameter data adjustment of the third step, a user can visually confirm the adjustment in a predetermined method each time a user is authenticated when the predetermined adjustment is performed. In the information signal processing method as described above, the playback video/audio test file, which is prepared for the attribute of each video/audio, includes the featured data that can be used for the predetermined parameter adjustment. In the information signal processing method as described above, during the display of the fourth step, a predetermined display operation is performed using predetermined data in the playback video/audio test file for each predetermined adjustment.

An information signal processing apparatus of the present invention comprises: data playback means for playing back various types of data from a recording medium, on which featured data is recorded in a predetermined recording area on the recording medium and also video/audio data is recorded tighter with the predetermined featured data extracted from the predetermined video/audio data, or image data, or audio data according to predetermined first parameter series data; digest playback period processing means for determining, according to a predetermined rule, the predetermined digest playback period of the video/audio data recorded on the recording medium according to the featured data and predetermined second parameter series data; operation mode input means for receiving an operation mode allowing a user to perform a playback control operation in the predetermined operation mode when the video/audio data is played back; playback control means for controlling the playback according to a signal from the operation mode input means; and data adjustment means for adjusting the first or second parameter series data according to the playback control status controlled by the playback control means.

The information signal processing apparatus as described above is characterized in that the apparatus further comprises playback period storage means for storing a playback period when the predetermined playback control is performed by the playback control means. The information signal processing apparatus as described above is characterized in that the data adjustment means adjusts the first or second parameter series data according to the predetermined featured data in the playback period when the predetermined playback control is performed by the playback control means. The information signal processing apparatus as described above further comprises: a recording medium on which test video/audio data of a predetermined time length is recorded wherein the first or second parameter series data can be adjusted using the test video/audio data after the adjustment by the data adjustment means.

An information signal processing method of the present invention comprises: a first step for playing back various types of data from a recording medium, on which featured data is recorded in a predetermined recording area on the recording medium and also video/audio data is recorded together with the predetermined featured data extracted from the predetermined video/audio data, or image data, or audio data according to predetermined first parameter series data; a second step for determining, according to a predetermined rule, the predetermined digest playback period of the video/audio data recorded on the recording medium according to the featured data and predetermined second parameter series data; a third step for receiving an operation mode allowing a user to perform a playback control operation in the predetermined operation mode selected by the user when the video/audio data is played back; a fourth step for controlling the playback according to a signal of the operation mode received in the third step; and a fifth step for adjusting the first or second parameter series data according to the playback control status controlled by the fourth step.

The information signal processing method as described above is characterized in that the method further comprises a step for storing a playback period when the predetermined playback control is performed by the fourth step. The information signal processing method as described above is characterized in that the adjustment of the first or second parameter series data in the fifth step is performed by adjusting the first or second parameter series data according to the predetermined featured data in the playback period when the predetermined playback control is performed through the playback control by the fourth step. The information signal processing method as described above further comprises: a step for storing predetermined test video/audio data of a predetermined time length in a predetermined method wherein the first or second parameter series data can be adjusted using the test video/audio data after the adjustment in the fifth step.

An information signal processing apparatus of the present invention comprises: image classifying processing means for performing predetermined classifying processing for predetermined image data using predetermined feature extraction data and predetermined setting parameter data; operation mode setting means for setting a predetermined operation mode according to the input of a user's desired command received by a predetermined operation unit; image data storage means for storing data for which the classifying processing is performed according to variable parameters wherein a plurality of predetermined variable adjustments are performed for the setting parameter data using the predetermined image data; image display means for reading the predetermined classified image data from the image data storage means and displaying the classified image data when the mode is set to a predetermined adjustment mode by the operation mode setting means; and parameter adjustment means for allowing a user to select an image from the images displayed by the image display means via the predetermined operation unit, and automatically assigning parameters, corresponding to the image, to the setting parameters of the image classifying processing means according to the image selection.

In the information signal processing apparatus as described above, the feature extraction data is generated by extracting from image data generated by performing predetermined bandwidth compression processing for the image data. In the information signal processing apparatus as described above, the classifying processing by the image classifying processing means is a predetermined similarity-based classification. In the information signal processing apparatus as described above, the image classifying processing means, the image data storage means, and the parameter adjustment means perform predetermined processing for each predetermined genre.

An information signal processing method of the present invention comprises: a first step for performing predetermined classifying processing for predetermined image data using predetermined feature extraction data and predetermined setting parameter data; a second step for setting a predetermined operation mode according to the input of a user's desired command received by a predetermined operation unit; a third step for storing data for which the classifying processing is performed according to variable parameters wherein a plurality of predetermined variable adjustments are performed for the setting parameter data using the predetermined image data; a fourth step for reading the predetermined classified image data from the image stored in the third step and displaying the classified image data when the mode is set to a predetermined adjustment mode by the operation mode setting in the second step; and a fifth step for allowing a user to select an image from the displayed images via the predetermined operation unit, and automatically assigning parameters, corresponding to the image, to the setting parameters of the image classifying processing according to the image selection.

In the information signal processing method as described above, the feature extraction data is generated by extracting from image data generated by performing predetermined bandwidth compression processing for the image data. In the information signal processing method as described above, the classifying processing by the first step is a predetermined similarity-based classification. In the information signal processing method as described above, the image classifying processing of the first step, the image data storage of the third step, and the parameter adjustment of the fifth step are performed by performing predetermined processing for each predetermined genre.

An information signal processing apparatus of the present invention comprises: detection determination means for determining if predetermined feature extraction data is detected from playback data on a predetermined recording medium or transmission data of a predetermined transmission unit; image classifying processing means for performing predetermined classifying processing using the feature extraction data and predetermined setting parameter data; operation mode setting means for setting a predetermined operation mode according to the input of a user's desired command received by a predetermined operation unit; image data storage means for storing data for which the classifying processing is performed according to variable parameters wherein a plurality of predetermined variable adjustments are performed for the setting parameter data using the predetermined image data; image display means for detecting the featured data, performing a plurality of predetermined variable adjustments for the setting parameter data, and performing the predetermined classifying processing using the parameters variable adjusted by the image classifying processing means if the detection determination means determines that the featured data can be detected when the mode is set to a predetermined adjustment mode by the operation mode setting means and for reading the predetermined classified image data from the image data storage means and displaying the classified image data if the detection determination means determines that the featured data is not detected; and parameter adjustment means for allowing a user to select an image from the displayed images via the predetermined operation unit, and automatically assigning parameters, corresponding to the image, to the setting parameters of the image classifying processing means according to the image selection.

In the information signal processing apparatus as described above, the feature extraction data is generated by extracting, through the predetermined extraction processing, from image data generated by performing predetermined bandwidth compression processing for the image data. In the information signal processing apparatus as described above, the classifying processing by the image classifying processing means is a predetermined similarity-based classification. In the information signal processing apparatus as described above, the image classifying processing means, the image data storage means, and the parameter adjustment means perform predetermined processing for each predetermined genre.

An information signal processing method of the present invention comprises: a first step for determining if predetermined feature extraction data is detected from playback data on a predetermined recording medium or transmission data of a predetermined transmission unit; a second step for performing predetermined image classifying processing using the feature extraction data and predetermined setting parameter data; a third step for setting a predetermined operation mode according to the input of a user's desired command received by a predetermined operation unit; a fourth step for storing data for which the classifying processing is performed according to variable parameters wherein a plurality of predetermined variable adjustments are performed for the setting parameter data using the predetermined image data; a fifth step for detecting the featured data, performing a plurality of predetermined variable adjustments for the setting parameter data, and performing the predetermined classifying processing that classifies images using the variably adjusted parameters if it is determined in the first step that the featured data can be detected when the mode is set to a predetermined adjustment mode in the third step and for reading the predetermined classified image data from the image stored in the fourth step and displaying the classified image data if it is determined in the first step that the featured data is not detected; and a sixth step for allowing a user to select a displayed image from the displayed images via the predetermined operation unit and automatically assigning parameters, corresponding to the image, to the setting parameters of the image classifying processing according to the image selection.

In the information signal processing method as described above, the feature extraction data is generated by extracting, through the predetermined extraction processing, from image data generated by performing predetermined bandwidth compression processing for the image data. In the information signal processing method as described above, the classifying processing in the second step is a predetermined similarity-based classification. In the information signal processing method as described above, the image classifying processing of the second step, the image data storage of the fourth step, and the parameter adjustment of the sixth step are performed by performing predetermined processing for each predetermined genre.

The information signal processing apparatus and the information signal processing method of the present invention allow the user to set parameter data for playing back a digest according to the user's desired preference, thus allowing the user to perform a more efficient digest playback operation that satisfies the user's requirement. Because the adjustment is performed simply by playing back a predetermined video/audio file and specifying a file, the user can perform a complicated parameter change easily by performing only a simple operation. In addition, the adjustment is performed by playing back the file corresponding to the adjustment parameters; the user can actually view how changed parameters affect the playback status. Therefore, the user can adjust the parameters easily and more efficiently. Because this parameter adjustment can also be performed according to a program genre, a more efficient adjustment that satisfies the user's requirement can be performed in a simple configuration.

The information signal processing system and the information signal processing method of the present invention allow the user to set parameter data for playing back a digest according to the user's desired preference, thus allowing the user to perform a more efficient digest playback operation that satisfies the user's requirement. When the parameter data for playing back a digest are adjusted, the user can confirm if the user desired digest playback can be performed using the data setting. Therefore, a more exact system can be configured efficiently. In addition, because the adjustment confirmation data is not included in the apparatus, the configuration of the apparatus for the adjustment processing is simpler than that of an apparatus that has the equivalent function. Therefore, an efficient and effective system can be configured. Because this parameter adjustment can also be performed according to a program genre, a more efficient adjustment that satisfies the user's requirement can be performed in a simple configuration.

The information signal playback apparatus and the information signal playback method of the present invention allow the user to easily adjust parameters while visually and actually confirming what scene is generated during digest playback by any parameter adjustment out of a plurality of parameter adjustments, thus making the adjustment efficient. Because the user can understand, on a time series basis, a scene change in the digest playback, generated by adjusting the parameters, and adjust the parameters while visually comparing a scene with the preceding or following scene, an effective and efficient parameter adjustment can be performed more easily. In addition, because the parameters can be adjusted for each user, an appropriate digest can be played back for each user more efficiently.

The information signal processing apparatus and the information signal processing method of the present invention allow the user to easily and efficiently adjust parameter data for playing back a digest via an operation unit such as a remote control. The user can easily adjust parameters by performing an operation such as a double-speed playback or a pause in the general operation mode without setting the mode to a complicated adjustment mode. Therefore, the user can play back a digest efficiently according to the user's requirement.

The information signal processing apparatus and the information signal processing method of the present invention allow the user to change the classification result of image classification according to the user's preference by adjusting the parameters. To adjust parameters, the user is required only to select parameters by comparing the sample images, generated by variably adjusting parameters, without executing complicated operations. In addition, when feature extraction data is not available at the time of adjustment, the sample images as well as the images to be actually classified can be displayed as a list for use in comparison when sample images area available. Therefore, the parameters for the classifying processing can be adjusted efficiently. Because this parameter adjustment can be performed for each image genre to be classified, efficient processing that can satisfies the user's preference can be performed.

BRIEF DESCRIPTION OF THE DRAWINGS

FIGS. 2A and 2B are diagrams showing an example of featured data in the first embodiment of the present invention;

FIG. 13 is a flowchart showing the operation in the adjustment mode in the second embodiment of the present invention;

FIGS. 25A to 25C are diagrams showing an example of the reprocessing of feature extraction data in the fifth embodiment of the present invention.

DESCRIPTION OF THE PREFERRED EMBODIMENTS

Next, embodiments of an information signal processing apparatus and an information signal processing method, an information signal processing system and an information signal processing method, and an information signal playback apparatus and an information signal playback method according to the present invention will be described with reference to the drawings.

[First Embodiment]

An information signal processing apparatus that can implement an information signal processing method in a first embodiment of the present invention performs predetermined feature extraction for image and audio signals using predetermined data signals during signal processing when the signal processing apparatus performs the predetermined bandwidth compression processing, such as MPEG, for the video/audio data included in a broadcast program, and records information on a predetermined recording medium.

Signal processing (play list generation processing), in which playback periods (play list) are determined according to a predetermined rule using predetermined parameter data, is performed so that the digest playback operation is executed by performing predetermined signal processing using the feature extraction data and by selecting predetermined playback periods from the recorded predetermined data.

The digest is played back by generating the play list. If a user-desired period cannot be played back, the generation of the play list can be adjusted by changing the parameter data.

When adjusting the parameters, the user moves the operation mode to a predetermined parameter adjustment mode and plays back one of several adjustment test files.

Each test parameter adjustment file contains predetermined parameter settings for performing predetermined summary processing. When the user selects a file that is considered to be close to the user's preference, the parameters corresponding to the adjustment file are automatically reflected on the parameter setting change.

In this way, the user can specify the parameter change for playing back the digest (for playing back the summary) simply by performing the playback operation in the same manner as the normal playback operation or by actually viewing the digest.

A first embodiment of the information signal processing apparatus according to the present invention will be described in the order described below with reference to the drawings.

(1) Example of block configuration (2) Operation flowchart

For simplicity, it is assumed in the description below that recorded video/audio information signals are broadcast program data and that predetermined compression processing is performed for the data using MPEG format.

(1) Example of Block Configuration (Description of Recording Processing Blocks)

Figure 1:
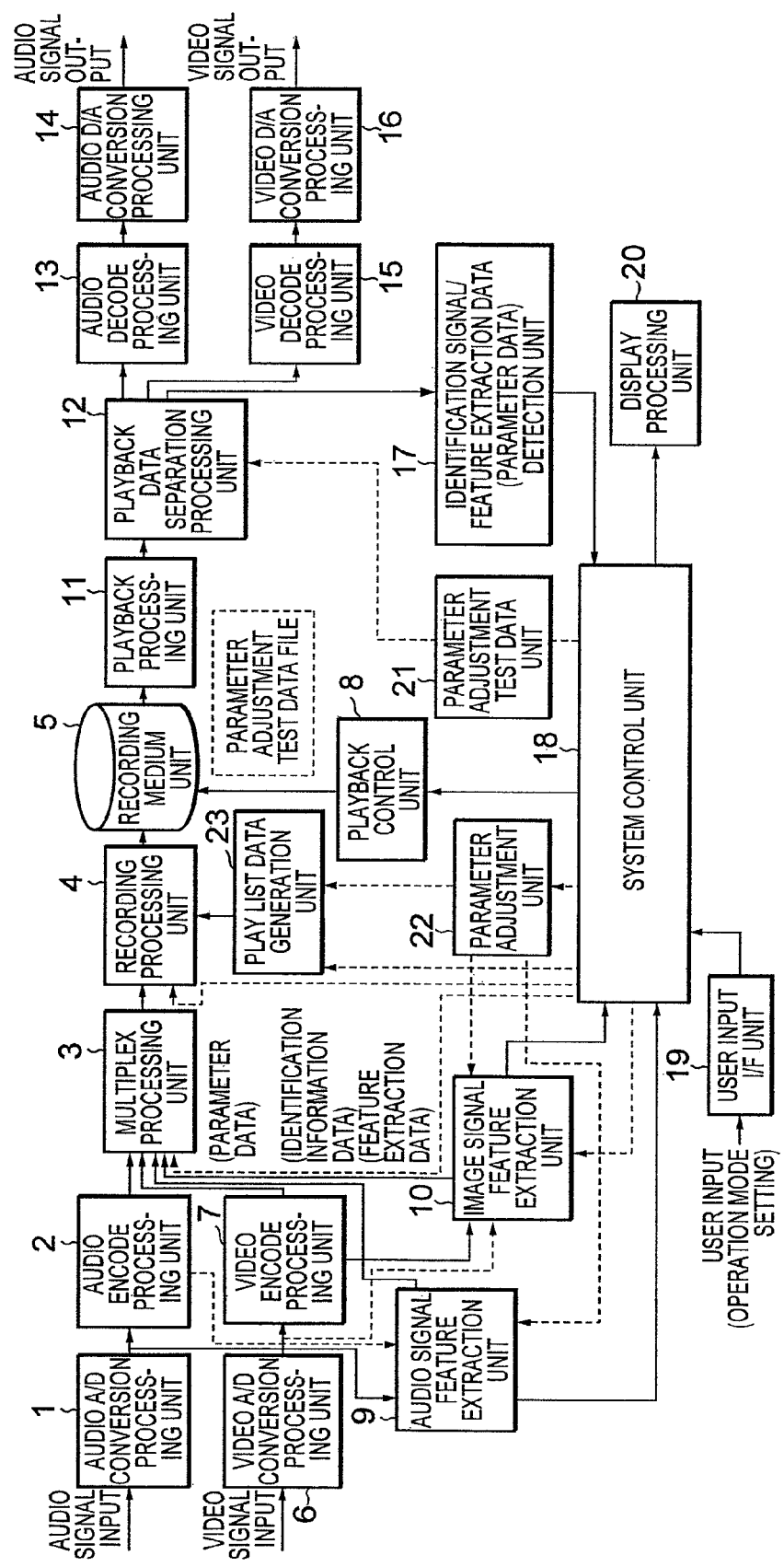
FIG. 1 is an example of the general block configuration of an information signal processing apparatus in a first embodiment of the present invention.

FIG. 1 is an example of the general block configuration of a recording/playback apparatus to which the present invention is applied. The recording/playback apparatus comprises an audio A/D conversion processing unit 1 that receives audio data and converts it to a digital signal; an audio encode processing unit 2 that receives the audio digital signal converted by the audio A/D conversion processing unit 1 and encodes it; a multiplex processing unit 3 that multiplexes the audio signal from the audio encode processing unit 2, a video signal, a feature audio signal, and a feature video signal; a recording processing unit 4 that controls the recording of the audio/video signal multiplexed by the multiplex processing unit; a recording medium unit 5 in which the audio/video signal controlled by the recording processing unit 4 is recorded; a video A/D conversion processing unit 6 that receives image data and converts it to a digital signal; a video encode processing unit 7 that receives the video digital signal converted by the video A/D conversion processing unit 6 and encodes it; an image signal feature extraction unit 10 that extracts a feature part from the digital signal obtained by the audio encode processing unit 2 and the video encode processing unit 7; a playback processing unit 11 that plays back data recorded in the recording medium unit 5; a playback data separation processing unit 12 that separates audio data and video data played backed by the playback processing unit 11; an audio decode processing unit 13 that decodes the separated audio data; an audio D/A conversion processing unit 14 that converts the decoded audio data to an analog signal and outputs it; a video decode processing unit 15 that decodes video data separated by the playback data separation processing unit 12; a video D/A conversion processing unit 16 that converts the decoded video data to an analog signal and outputs it; a playback control unit 8 that controls the playback of the recording medium unit 5 according to an instruction from a system control unit 18; an identification signal/feature extraction data detection unit 17 that detects featured data separated by the playback data separation processing unit 12; a user input I/F unit 19 that receives a user operation input; the system control unit 18 that controls the input of operation data from the user input I/F unit 19, the input of featured data from the identification signal/feature extraction data detection unit 17, the playback control unit 8, and the display of data onto a display processing unit 20; the display processing unit 20 that plays back and displays data under control of the system control unit 18; a parameter adjustment test data unit 21 that generates parameter adjustment test data; a parameter adjustment unit 22; and a play list data generation unit 23 that generates play list data.

The operation of the information signal playback apparatus having this configuration will be described. First, an audio signal is converted from analog to digital by the audio AD conversion processing unit 1 and the predetermined encode processing is performed by the audio encode processing unit 2. The signal converted from analog to digital or the encoded signal is inputted to an audio signal feature extraction unit 9 where predetermined audio feature extraction is performed.

A video signal is processed similarly. The video signal is converted from analog to digital by the video AD conversion processing unit 6 and predetermined encode processing is performed by the video encode processing unit 7. The signal converted from analog to digital or the encoded signal is inputted to the image signal feature extraction unit 10 where predetermined image feature extraction is performed.

In the recording mode, featured data is serially detected for each predetermined period and is recorded in the predetermined recording area of the predetermined recording medium unit 5 with the video/audio data for which the predetermined encoded processing described above was performed.

The feature extraction data described above is accumulated for the predetermined period via the system control unit 18 and is used by the play list data generation unit 23 to generate play list data that will be used in predetermined digest playback (summary playback).

The generated play list data, for which the recording processing unit 4 performs the predetermined recording processing, is recorded in the predetermined recording area of the recording medium unit 5.

The play list data comprises data on a playback start frame number and a playback end frame number that will be used in the skip playback of the predetermined recorded period.

Figure 3:
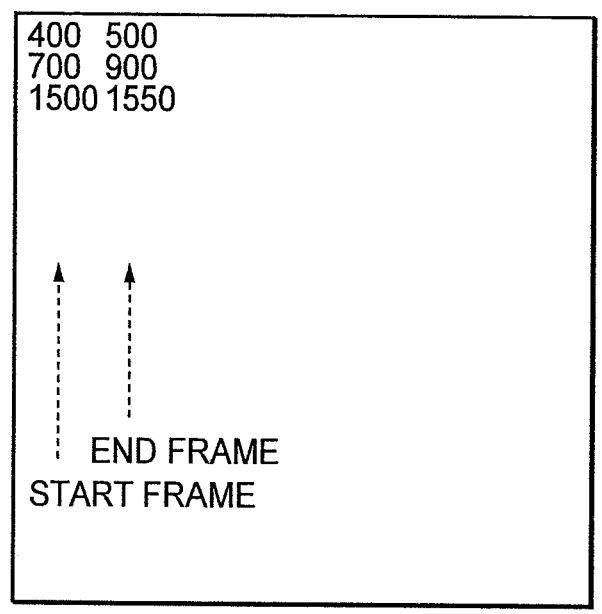
FIG. 3 is a diagram showing an example of a play list data in the first embodiment of the present invention.

FIG. 3 shows an example of data in the play list data file. The left side data column indicates skip playback start frames, and the right side data column indicates playback end frames.

The play list data described above is used to perform digest playback (summary playback) by skip playing back the predetermined necessary periods of the recorded program. Instead of the frame data described above, timestamp data such as time code data or PTS (Presentation Time Stamp) and DTS (Decode Time Stamp) used in MPEG format may also be used as the play list data.

The play list data described above can be generated not only by performing predetermined generation processing after recording a predetermined program in the recording mode in which video/audio information data such as that of a broadcast program is recorded as described above but also by performing predetermined processing using feature extraction data in the playback mode that will be described later.

(Description of Playback Processing Block)

When the mode is changed to the playback mode via the user input I/F unit 19, the recorded predetermined data such as predetermined video/audio information data and feature extraction data is played back from the recording medium unit 5 and predetermined playback processing is performed by the playback processing unit 11.

The played-back predetermined data is separated by the playback data separation processing unit 12 into predetermined data. The audio data is inputted to the audio decode processing unit 13 in which predetermined decode processing is performed. After that, the decoded audio data is inputted to the audio D/A conversion processing unit 14, the audio data is converted from digital to analog, and the converted data is outputted as the audio signal.

The image data, which is generated by the predetermined classifying processing, is decoded by the video decode processing unit 15. After that, the decoded image data is inputted to the video D/A conversion processing unit 16, the D/A conversion processing is performed, and the converted data is outputted as the video signal.

If the feature extraction data, parameter data, or play list data is recorded, the identification data/feature extraction data (parameter data) detection unit 17 detects the predetermined data.

The feature extraction data, the parameter data, and the like described above are detected in the play list generation mode or the play list adjustment mode. In the normal playback mode, there is no need to detect them.

(Description of Digest Playback (Summary Playback) Mode))

To play back a digest, the mode is specified via the user input I/F unit 19 and the mode is changed to the digest playback mode. If the play list data file is already generated in the recording mode after the predetermined program is ended, the data file is played back from the recording medium unit 5 and is inputted from the identification signal/feature extraction data detection unit 17 to the system control unit 18.

In response to the skip playback start data information and the skip playback end data information in the play list data detected and played back as described above, the system control unit 18 plays back the digest by skipping playback the predetermined data in the recording medium unit by controlling the playback control unit 8 using the signal from the system control unit 18.

If the play list data is not generated and cannot be detected during playback or if the user wants to re-generate the play list data that is detected during playback, the play list data is generated from the predetermined feature extraction data and the parameter data that are detected during playback.

(Description of Parameter Adjustment Mode)

If the user plays back a digest using predetermined play list data in the digest playback mode and finds that a desired digest is not played back, the user can change the play list and modify the play list data by changing various types of parameter data used for play list processing.

In this case, the parameters are adjusted for changing the play list in one of two methods: in one method, the first parameter is adjusted by the feature extraction processing unit or the feature extraction data detection unit 17; in the other method, the second parameter generated from the feature extraction data is adjusted for changing and adjusting the generation of play list data.

For example, the method of adjusting the first parameter is applicable when a program of the same program genre is recorded next. The method of adjusting the second parameter, which is used to play back the digest of the same program again, is applicable when other programs whose genre is the same as that of the program are played back.

The following describes featured data whose feature is extracted at the same time when the video/audio data is recorded in the recording mode.

For simplicity, it is considered that the featured data are recorded in a plurality of files. In the description below, audio featured data (and data file) corresponding to the feature of an audio segment and telop featured data (.tlp data file) corresponding to the appearance of telop information are used.

The featured data other than those described above includes camera featured data (.cam data file) corresponding to the feature of camera operations such as panning and zooming, color featured data (.col data file) corresponding to the feature of color information in the screen image, and scene ID data (.sid data file) indicating whether or not a similar scene appears using a predetermined ID.

FIGS. 2A and 2B show an example of an audio featured data file and a telop featured data file. Audio featured data comprises the start frame number of a feature period, the end frame number of a feature period, the average power of a feature period, and the audio type of a feature period. Telop featured data comprises the start frame number of a feature period, the end frame number of a feature period, a telop area, and the number of detected macro blocks.

Figure 4:
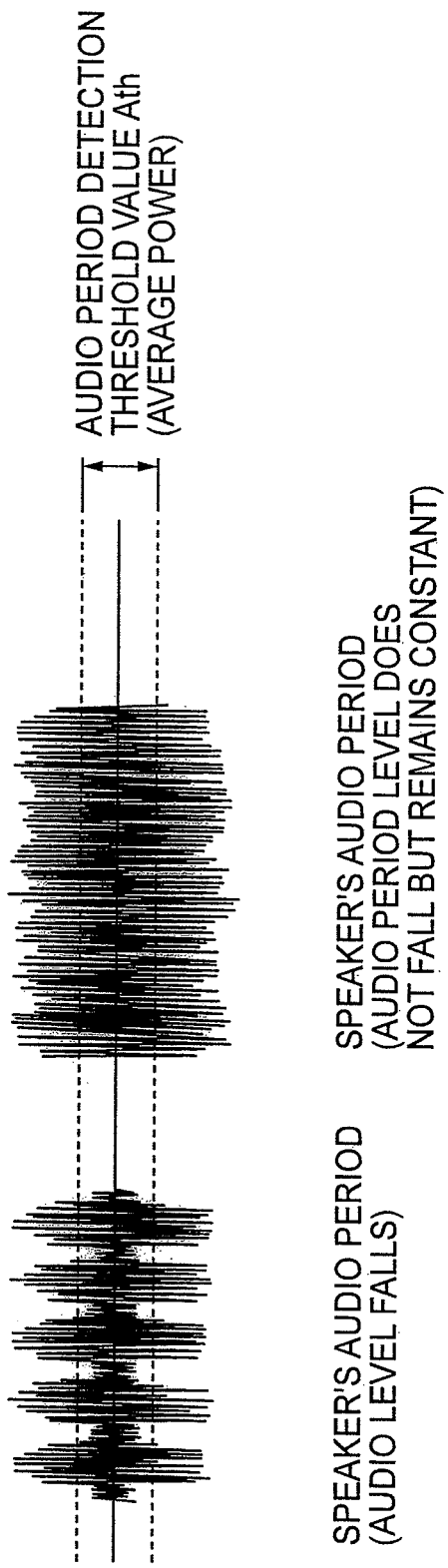
FIG. 4 is a diagram showing audio feature extraction in the first embodiment of the present invention.

When considering the audio signal, the threshold value Ath is set as the parameter when there is an audio signal such as the one shown in FIG. 4. If the average power of a predetermined period is higher than Ath, it is determined that the period is an audio feature period, and if the average power is lower, it is determined that the period is not an audio feature period.

Because a person's speaking voice (speaker's audio period) includes a consonant period, a vowel period, and a breathing period, the period of the predetermined or higher power is shorter than that of music and the like (other than speaker's audio). Therefore, with the time threshold value Tth set as the parameter, if the average length of continuation time of a predetermined or higher power is shorter than Tth, the period is determined to be a speaker's period (V (Voice) period), and if the average is longer, the period is determined to be a non-speaker period (NV (Non Voice) period).

Next, it is considered the detection of a telop. The known art includes those disclosed in Japanese Laid-Open Patent JP2001-76094A (Character string information extraction apparatus and method and recording medium recording the method thereon), Japanese Laid-Open Patent JP2000-187732A (Character area determination method and apparatus and recording medium recording the method thereon), and the like.

Figure 5:
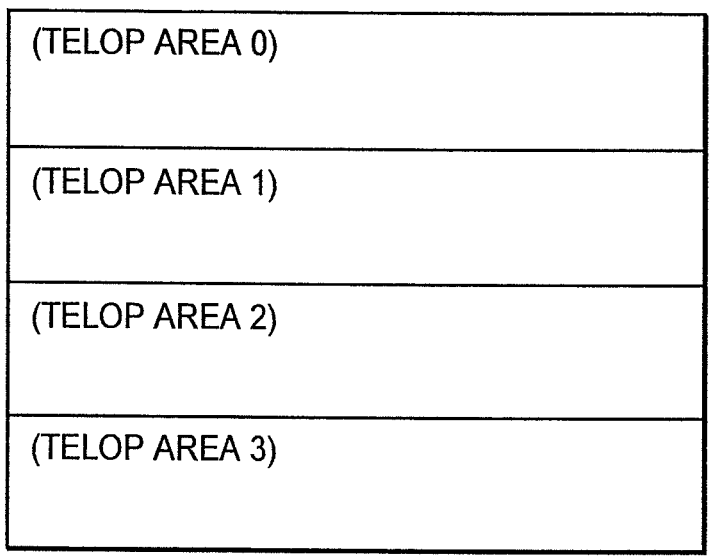
FIG. 5 is a diagram showing telop feature extraction in the first embodiment of the present invention.

The following briefly describes how to detect a telop. The screen is divided into several areas as shown in FIG. 5. The number of edges is calculated for the macro block of a predetermined area. If the number of edges is larger than the predetermined threshold value Eth that is set as the parameter, it is determined that a telop occurs. An area specified as an area where telop detection is to be performed can be also thought of as a parameter.

The number of edges is able to be calculated through a method using AC coefficient in MPEG format image data, or the multi-resolution analysis using the wavelet analysis.

If Ath and Tth used in audio featured data processing, Eth used in telop featured data processing, and a detection area, which are used as the first parameter series, are changed as described above, the feature extraction data is also changed.

Next, the following describes play list data.

Again, for simplicity, it is considered that the play list data is generated from the audio featured data and the telop information data described above. As described above, the play list data may also be generated by considering other feature extraction data such as the .cam data file, the .col data file, and .sid data file.

Figure 6:
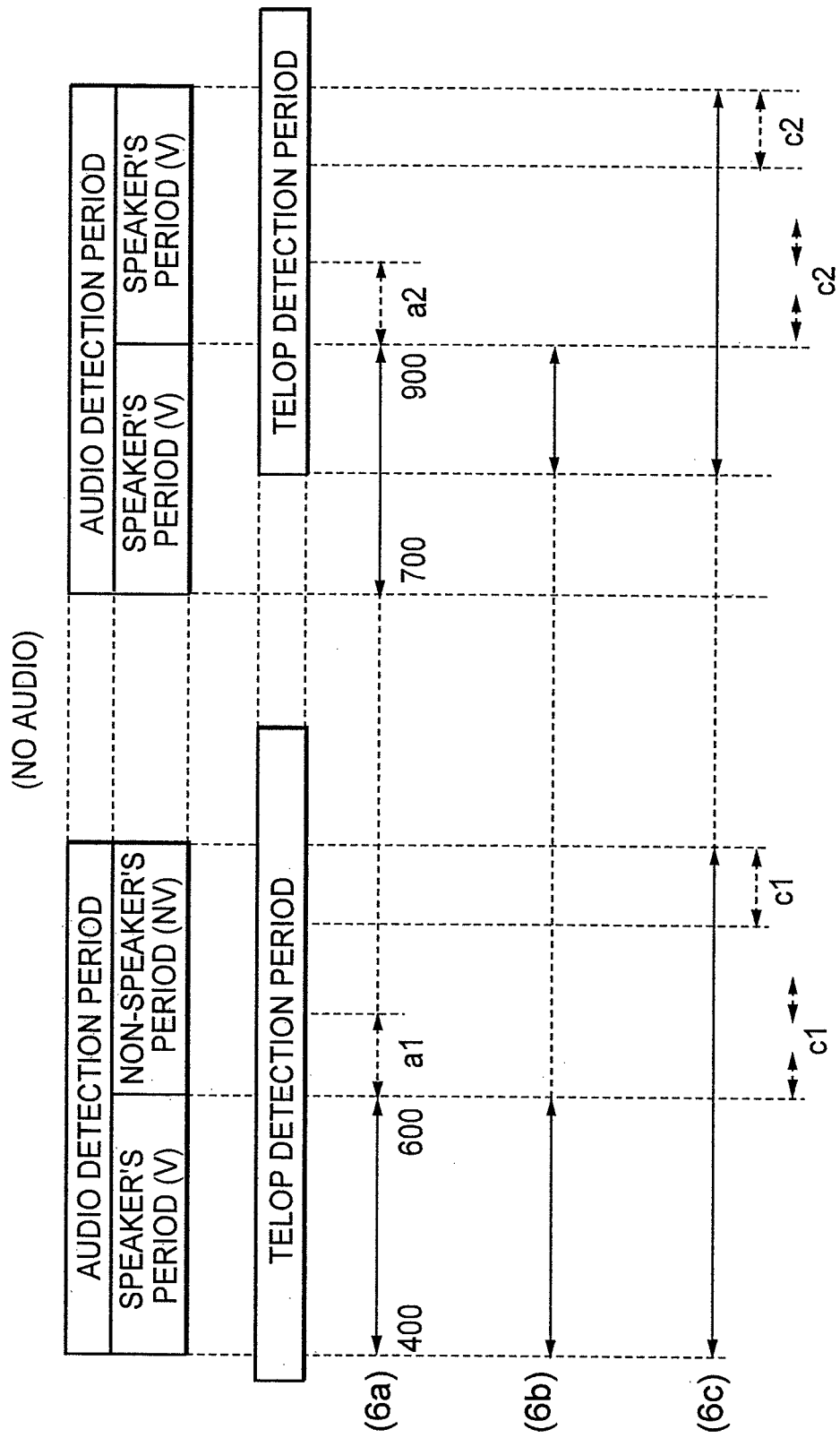
FIG. 6 is a diagram showing play list data generation in the first embodiment of the present invention.

FIG. 6 shows the relation between various types of feature extraction data described above and the play list data.

In FIG. 6, (6*a*) shows processing in which priority is given only to the speaker's audio periods, (6*b*) shows processing in which priority is given to the periods containing both the speaker's audio period and the telop period, and (6*c*) shows processing in which priority is given to the audio detection periods and the telop detection periods regardless of the type of audio.

As described above, the play list data changes according to what feature extraction data periods are selected as the second parameter.

When generating a play list, the feature extraction data described above as well as the user-specified playback time is taken into consideration. The generated play list period described above is increased or decreased so that the playback time becomes as close as possible to the user-specified playback time. The data generated after this processing is used as the play list data.

For example, if the playback time is shorter than the user-specified playback time Pbt in the processing period in (6*a*) of FIG. 6, periods a1 and a2 are added after the skip playback end points on average so that the total playback time becomes close to the playback time Pbt on the whole.

For example, if the playback time is longer than the playback time Pbt in the processing in (6*c*) of FIG. 6 described above, the skip playback periods are shortened on average by c1 and c2 so that the playback time becomes close to the user specified playback time Pbt.

When the user who is playing back the digest finds that the digest is not played back as desired, the user can move to the digest playback parameter adjustment mode to change the first and second parameter settings for adjusting the play list.

The parameter adjustment mode is activated through the user input I/F unit 19 to cause the system control unit 18 to control the parameter adjustment unit 22.

This causes the play list data generation unit 23, or the image feature extraction unit 10 and the audio feature extraction unit 9 which perform feature extraction processing, to perform predetermined processing according to a change in the parameter.

There are two parameter series as described above. They are the first parameter series used in the feature' extraction processing, and the second parameter series used for generating a play list using the feature extraction data. Because each parameter series is adjusted multiple times, the user encounters the adjustment complicated.

For simplicity, it is considered how to perform the second parameter adjustment. The parameters corresponding to (6a), (6b), and (6c) in FIG. 6 described above are set, and the adjustment files for which digest playback processing is performed are prepared. In the parameter adjustment mode, the user plays back adjustment files as required and specifies a file that most meets the preference of the user. This allows the user to automatically change the parameter setting corresponding to the file.

Figure 7:
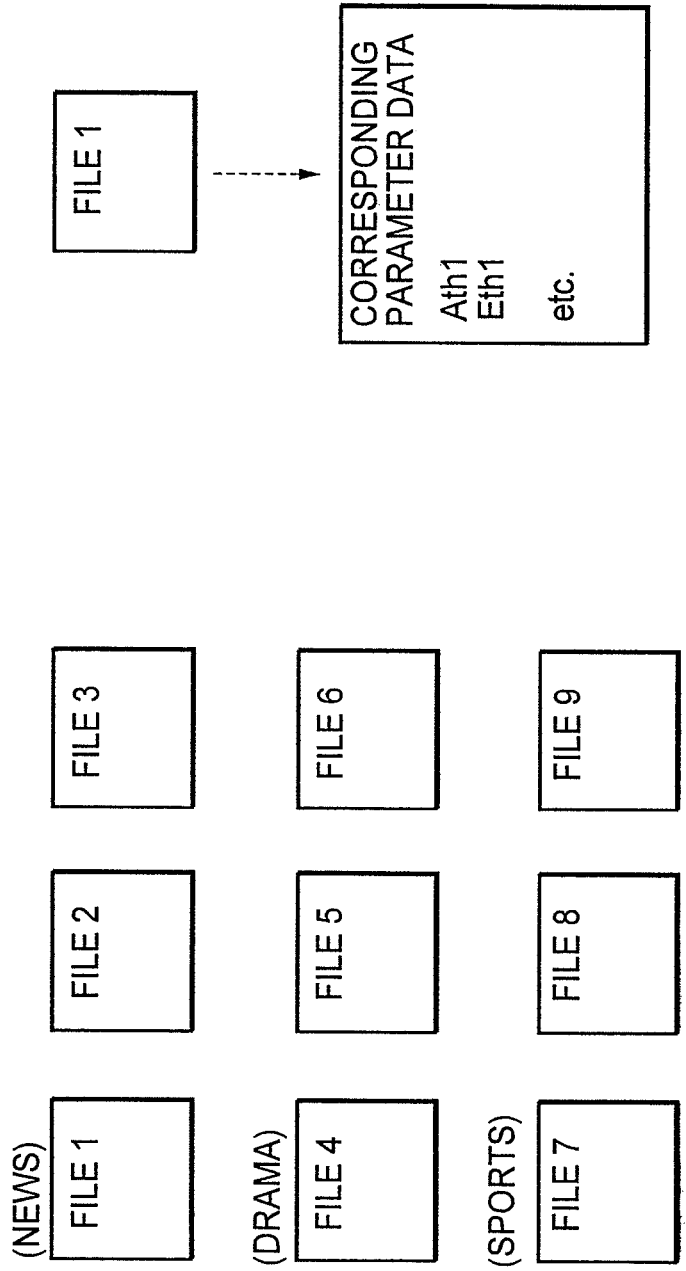
FIG. 7 is a diagram showing an adjustment test file in the first embodiment of the present invention.

The adjustment files are prepared for each program genre as shown in FIG. 7 to allow the user to perform parameter adjustment for each genre.

In the parameter adjustment mode, the user moves to the parameter adjustment mode through the user input I/F unit 19 and selects a program genre, for which the user wants to adjust parameters, from the files such as those shown in FIG. 7.

For example, when the user selects "news" as the program genre and selects one of file 1 to file 3, the adjustment data stored in the parameter adjustment test data unit 21 is inputted to the playback processing unit 11. After that, various types of predetermined signal processing are performed and the audio data and the image data are outputted.

The user views the adjustment file data that is played back and inputs the specification of a file, which is thought to be most similar to the user-desired digest playback, to the system control unit 18 via the user input I/F unit 19 such as a remote control.

The system control unit 18 changes the setting parameter corresponding to the specified file via the parameter adjustment unit 22.

In this case, the adjustment file data may be a file that is several minutes long at the longest, and the picture size may be smaller than the normal size.

For example, if the picture size is 720×480 in the MPEG2 format during normal recording and playback, any of the normal picture size, a ¼ size that is about 180×120, or a still smaller size may be used. The transmission rate may also be about 2-10 Mbps that is lower than that of the normal recording and playback.

Figure 10:
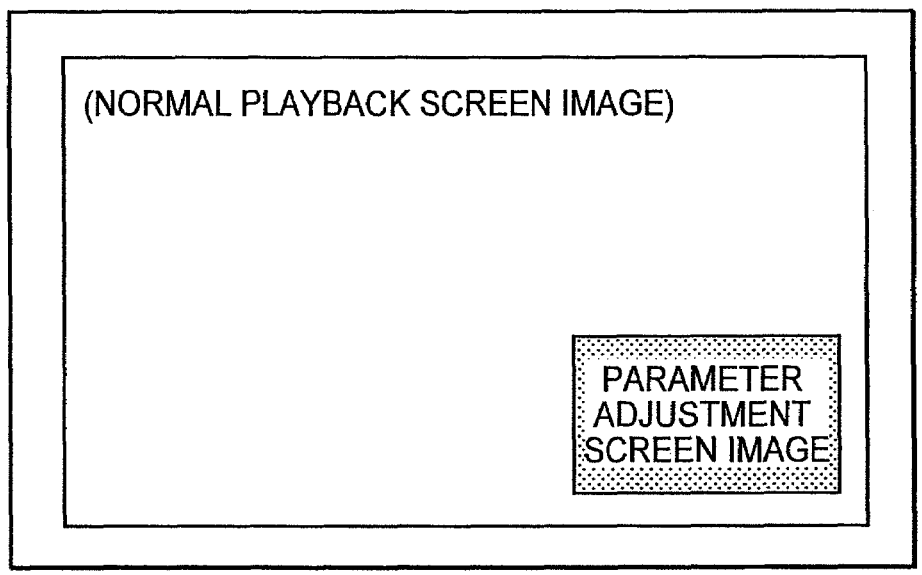
FIG. 10 is a diagram showing an example of a display in adjustment mode (sub screen) in the second embodiment of the present invention.

In the parameter adjustment mode, it is also possible to display the adjustment file as a sub screen image of a smaller picture size as described above while data is displayed in the normal playback mode. The conceptual diagram of such a display is shown in FIG. 10.

(2) Operation Flowchart

Figure 8:
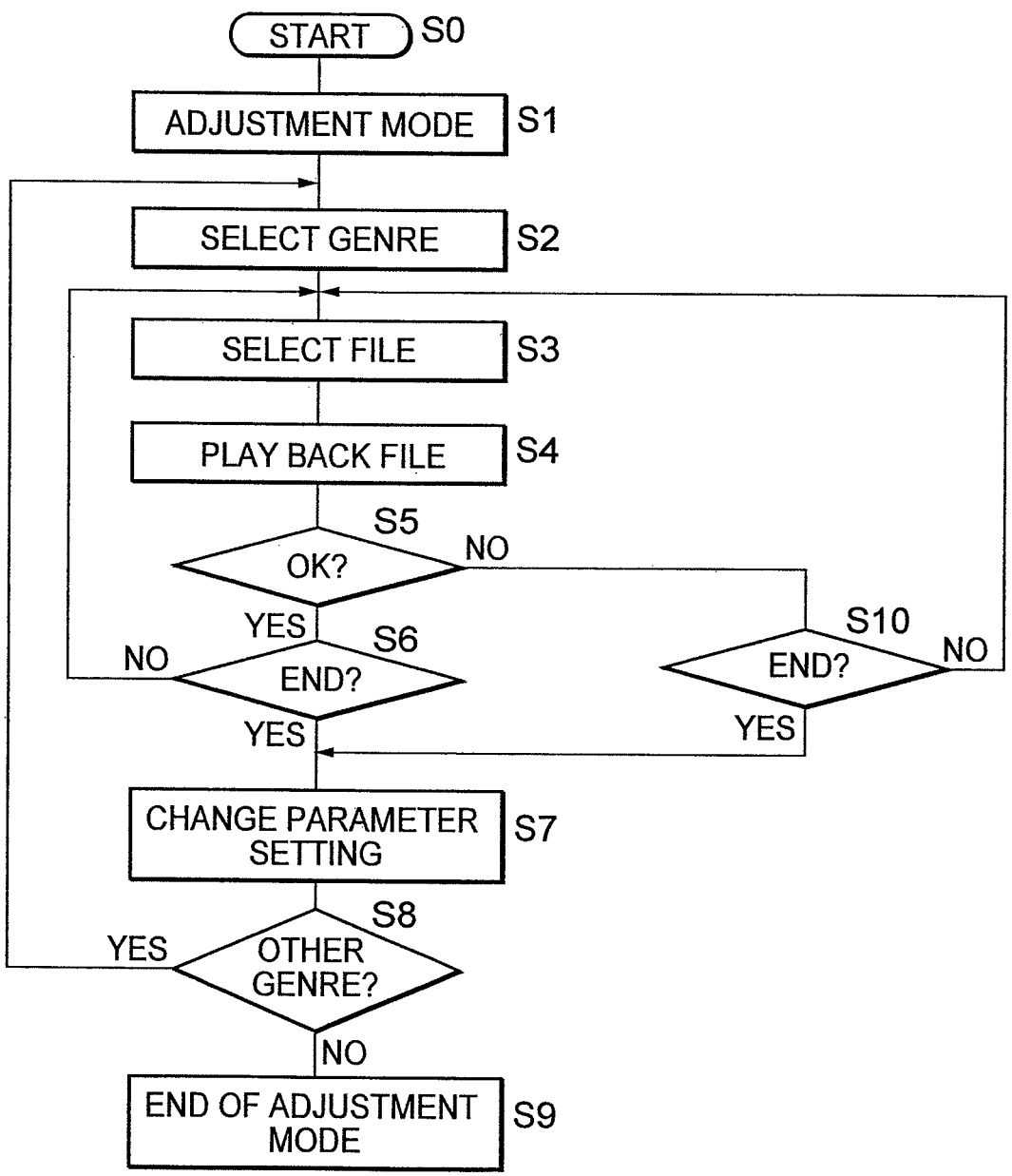
FIG. 8 is a flowchart showing the adjustment mode operation in the first embodiment of the present invention.

FIG. 8 shows an example of the operation flowchart in the parameter adjustment mode. The following describes each step.

The operation starts in step S0, the mode is set to the parameter adjustment mode in step S1, a program genre to be adjusted is selected in step S2 and, after that, a file to be played back is selected in step S3.

The selected adjustment file is played back in step S4 and the user checks if the file satisfies the need in step S5.

If the file satisfies the need, the adjustment of the genre is terminated in step S6 and the setting parameter corresponding to the file is changed in step S7.

The user checks if another program genre is to be adjusted in step S8. If no other genre is to be adjusted, the adjustment mode is ended in step S9, and if some of the other program genre is adjusted, control is passed to step S2 to repeat adjustment.

If it is found the file is not a desired playback file in step S5, whether to end the adjustment is checked in step S10. If the adjustment is not ended but continued, control is passed to step S3 and a file is selected again in step S3 to continue the adjustment.

[Second Embodiment]

Next, an information signal processing system that can implement an information signal processing method in a second embodiment of the present invention will be described with reference to the drawings. It should be noted that like reference numerals are used for the same components as those of the first embodiment and their descriptions are omitted.

The information signal processing system in the second embodiment of the present invention performs predetermined feature extraction for image and audio signals using predetermined data signals during signal processing when the information signal processing system, performs the predetermined bandwidth compression processing, such as MPEG format, for the video/audio data included in a broadcast program and records information on a predetermined recording medium.

The information signal processing system performs signal processing (play list generation processing) in which playback periods (play list) are determined according to a predetermined rule using predetermined parameter data so that the digest playback operation is executed by selecting predetermined playback periods from the predetermined recorded data that is recorded by performing predetermined signal processing for feature extraction data.

A digest is played back based on the play list generation processing described above. If the user finds that the user-desired period is not played back, the user can adjust the generation of the play list by changing the parameter data described above.

To adjust parameters, the user uses a remote control or the predetermined mode selection method of the apparatus to change the mode to the adjustment mode. Upon recognizing that the mode is changed to the adjustment mode, the apparatus is connected automatically to the network and then connected to the predetermined site for adjusting parameters.

Once the apparatus is connected to the site, the user can use a predetermined procedure to download predetermined data and adjust parameters. If the apparatus cannot be connected to the predetermined site because of a network failure or a network unit failure, the apparatus recognizes it automatically. In this case, the user can adjust parameters via a remote control or the apparatus itself without connecting the apparatus to the network.

The user can fine-adjust the parameters according to the program genre in the adjustment when the apparatus is connected to the network, while the predetermined adjustment data must be prepared in the apparatus in the adjustment when the apparatus is not connected to the network. Therefore, to simplify the configuration of the apparatus, it is also possible not to provide the ability for fine adjustment described above.

The second embodiment of the present invention will be described with reference to the drawings in the sequence given below.

(1) Example of block configuration
(2) Operation flowchart
(1) Example of Block Configuration
(Description of Recording Processing Block)

Figure 9:
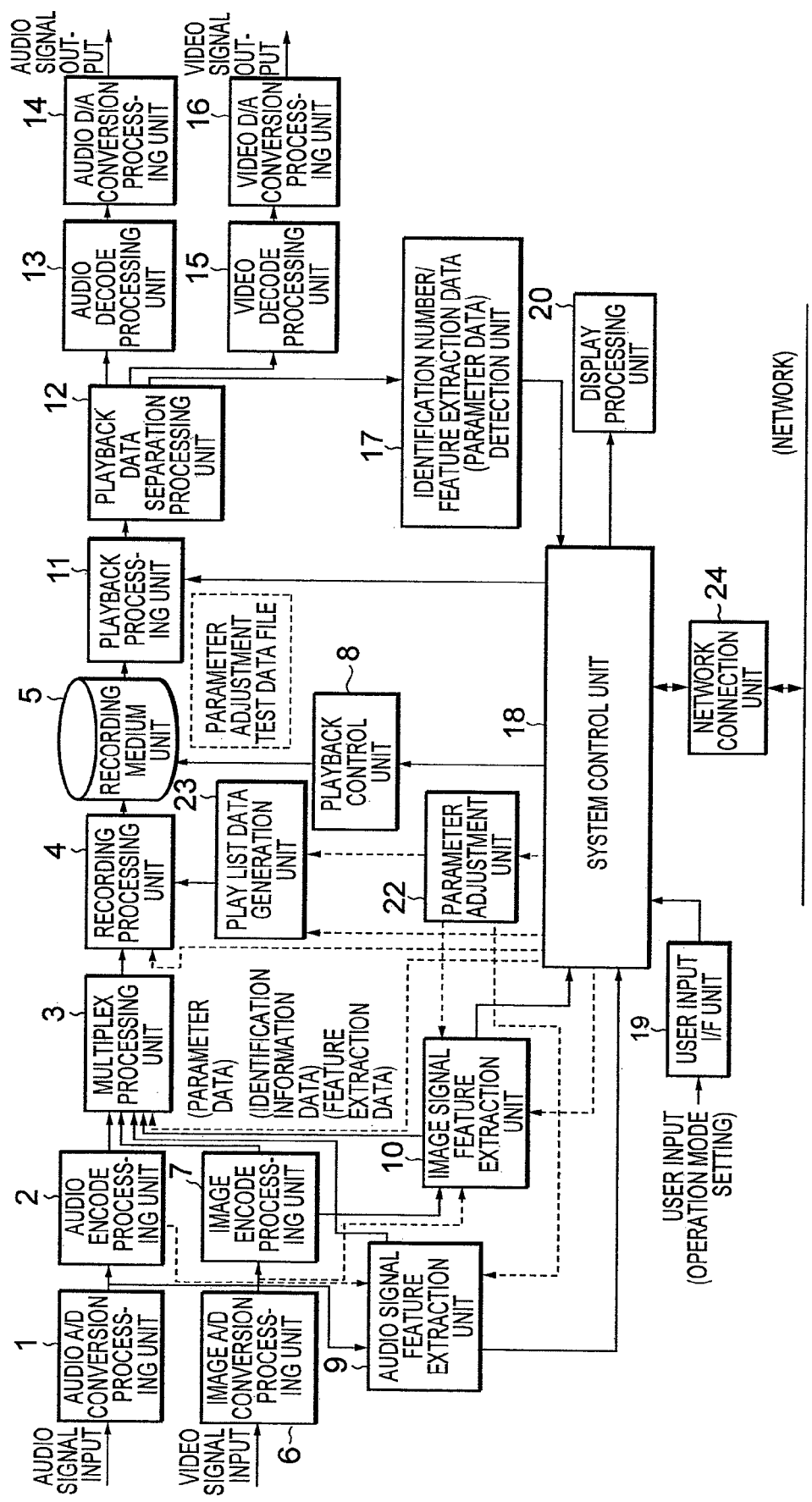
FIG. 9 is an example of the general block configuration of an information signal processing system in a second embodiment of the present invention.

FIG. 9 is an example of the general block configuration of a recording/playback apparatus to which the present invention is applied. Like reference numerals are used for the same components as those of the configuration shown in FIG. 1 and their descriptions are omitted. The configuration generally comprises those common components and a network connection unit 24.

The operation of the information signal playback apparatus having this configuration will be described. First, an audio signal is converted from analog to digital by the audio AD conversion processing unit 1 and the predetermined encode processing is performed by the audio encode processing unit 2. The signal converted from analog to digital or the encoded signal is inputted to an audio signal feature extraction unit 9 where predetermined audio feature extraction is performed.

A video signal is converted from analog to digital by the video AD conversion processing unit 6 and predetermined encode processing is performed by the video encode processing unit 7. The signal converted from analog to digital or the encoded signal is inputted to the image signal feature extraction unit 10 where predetermined image feature extraction is performed.

In the recording mode, featured data is serially detected for each predetermined period and is recorded in a predetermined recording area of the predetermined recording medium unit 5 with the video/audio data for which the predetermined encoded processing described above is performed.

The feature extraction data described above is accumulated for a predetermined period via the system control unit 18 and is used by the play list generation unit 23 to generate play list data that will be used in predetermined digest playback (summary playback).

The generated play list data, for which the recording processing unit 4 performs the predetermined recording processing, is recorded in a predetermined recording area of the recording medium unit 5.

The play list data is composed of data on a playback start frame number and a playback end frame number that will be used in the skip playback of a predetermined recorded period (see FIG. 3).

In the parameter adjustment mode, an input through the user input I/F unit 19 causes the system control unit 18 to connect the apparatus to a predetermined network via the network connection unit 24 and automatically to a predetermined parameter adjustment site.

At this network adjustment site, the user can select, for example, a program genre. The user can select desired data from a plurality of data files prepared for a program genre to play back the image and the audio (streaming playback or predetermined download playback).

The video/audio data stored in the parameter adjustment site is the data generated by performing summary playback processing (digest playback processing) for a video/audio program of a predetermined program genre using several different parameter settings. One data file at the site is corresponded to predetermined parameter series.

The user can arbitrarily play back several video/audio data sequentially from the predetermined site. When desired data is played back, the user can perform a predetermined operation to download a predetermined parameter series (parameter group) corresponding to the played back data file via the network unit 24 and then control the parameter adjustment unit 22 via the system control unit 18 to make predetermined parameter adjustment easily.

Adjusting parameters as described above causes the play list data generation unit 23 or, during the feature extraction processing, causes the image feature extraction unit 10 or the audio feature extraction unit 9, to perform predetermined processing according to the change in the parameters.

The following describes an example of a video/audio file (file for streaming or file for download playback) prepared at the parameter adjustment site.

The video/audio files for each program genre are provided at the parameter adjustment site as shown in FIG. 7 to allow the user to adjust parameters of each genre.

For example, when the user selects "news" as the program genre in the predetermined home page at the parameter adjustment site using an operation unit such as a remote control and selects one of file 1 to file 3, the video/audio streaming data or download data for adjustment is inputted to the playback processing unit 11 through the system control unit 18 via the network connection unit 24.

After that, predetermined signal processing is performed and an image and an audio are output from the video D/A conversion processing unit 16 and the audio D/A conversion processing unit 14, respectively. The user views the played back data and determines if the played back data is close to the user-desired digest playback.

A video/audio file for adjustment corresponds to the predetermined parameters as shown in FIG. 7. In this example, file 1 whose program genre is "news" is corresponded to the audio period detection parameter threshold value Ath1, the telop detection parameter Eth1, and others. Those corresponding parameters are parameter series (parameter group) selected for use in adjustment.

Another file, for example, file 2 is corresponded to different parameters such as Ath2, Eth2, and the like if selected.

When the user selects a desired file with an operation unit such as a remote control and specifies it with a predetermined command, the corresponding parameter series is downloaded via the network connection unit 24 and is passed to the parameter adjustment unit 22 via the system control unit 18.

The user operation described above adjusts the image signal feature extraction unit 10 and the audio signal feature extraction unit 9 and causes those units to perform the parameter-adjusted feature extraction processing that is different from before the adjustment.

Although the adjustment of the first parameter series for the feature extraction processing is described above, the user can make the second parameter adjustment. At the parameter adjustment site, the user can select one of two parameter adjustments: first parameter adjustment and second parameter adjustment.

In the second parameter adjustment, a plurality of video/audio files, each containing predetermined parameter center values that are already determined, are prepared in advance and the user arbitrarily selects one of those files to specify the file the user desires.

When the user specifies the file with a predetermined command, the predetermined parameter series is downloaded as in the first parameter adjustment and the play list data generation unit 23 is adjusted via the parameter adjustment unit 22 for generating a predetermined play list using the adjusted parameters.

In the second parameter adjustment, the parameter indicates information on how to select a predetermined feature period detected based on the featured data as shown in FIG. 6. For example, as the program genre is "news" and the first parameter setting is with parameters of the predetermined center value (Ath0, Eth0, . . . ), the video/audio files, which is created by selecting each predetermined feature period shown by (6a), (6b), and (6c) in FIG. 6 are prepared.

The user arbitrarily selects a file, either plays back the file in the streaming mode or downloads the file and plays it back, and designates the file with a predetermined command. Then, the predetermined second parameter series is downloaded in the same manner as the first parameter.

In this case, if the predetermined network connection cannot be established because of a network failure or a site failure for some reason or if the predetermined parameter adjustment or the parameter download cannot be performed, it is also possible to allow the operation mode display unit 20 to automatically display a warning or generate a sound to issue a warning to the user.

In that case, it is also possible to play back the data from the adjustment data recorded in the predetermined recording area in the recording medium unit 5 or in the predetermined memory unit other than the recording medium unit 5 and to make the same adjustment as that described above.

Because a higher recording capacity is required as more adjustment video/audio files are prepared in such a case, it may be also possible to simply make either the first parameter adjustment or the second parameter adjustment exclusively.

An image used for adjustment recorded in the recording medium unit 5 or some of the other medium may be a file that is several minutes long at the longest and the picture size may be smaller than the normal size.

If the picture size in the MPEG2 format is 720×480 during normal recording/playback, the normal picture size, 180×120 that is about ¼ of the normal picture size, or a still smaller picture size may also be used. The transmissions rate may also be about 2 to 10 Mbps that is lower than that of normal recording/playback.

(An Example of a Change in a Featured Data File Due to a Parameter Change)

The following describes the concept of how a detection period is adjusted and changed by the parameter adjustment. For simplicity, audio featured data and telop featured data will be described.

Figure 11:
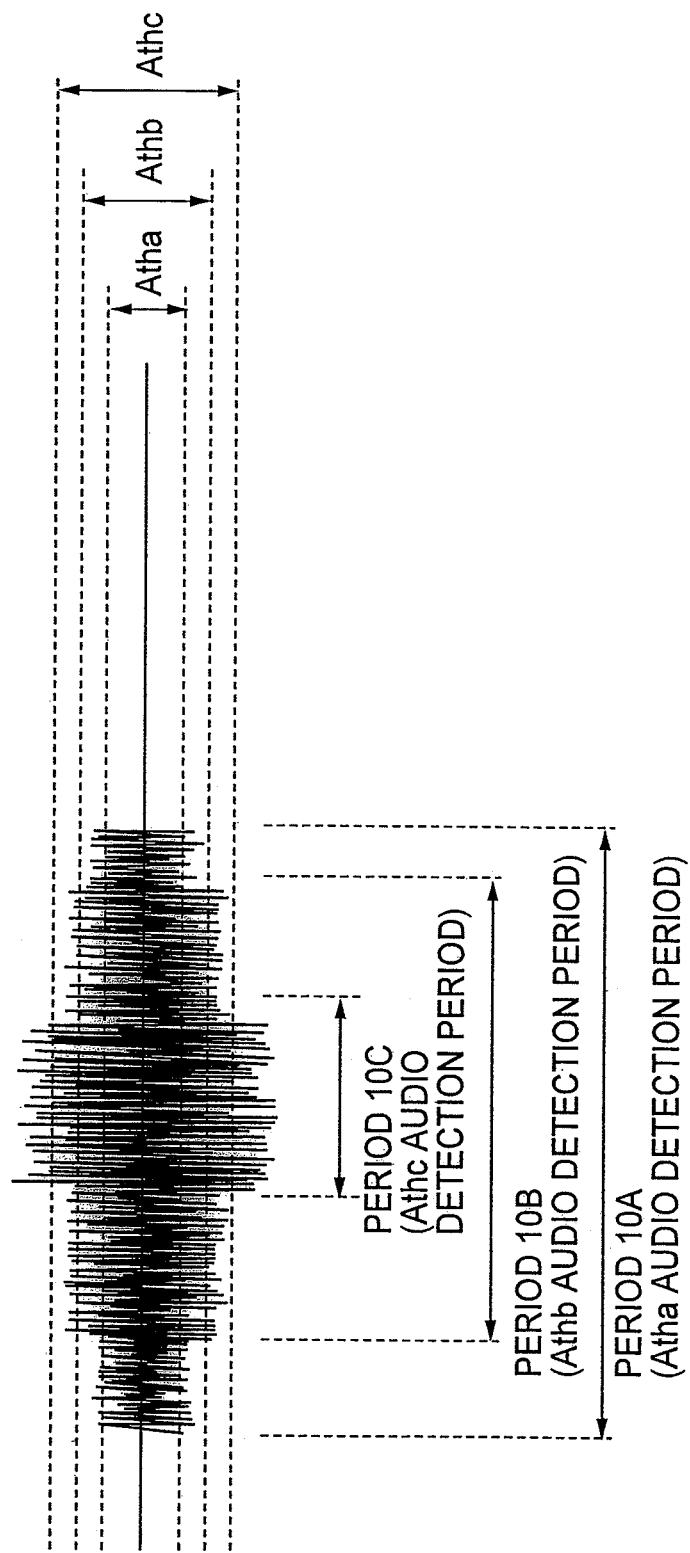
FIG. 11 is a diagram showing audio feature parameter adjustment in the second embodiment of the present invention.

FIG. 11 shows how a detection period is adjusted by audio feature parameters.

It is assumed that there are parameters Atha, Athb, and Athc and that their values increase in this order. The average power of the audio signal in the predetermined period is detected. If the parameter is Atha, the period 10A whose average power is equal to or higher than Atha is determined to be the audio detection period.

Similarly, if the parameter is Athb, the period 10B whose average power in the predetermined period is Athb is determined to be the audio interval. If the parameter is Athc, the period 10C whose average power in the predetermined period is Athc is determined to be the audio interval.

Figure 12:
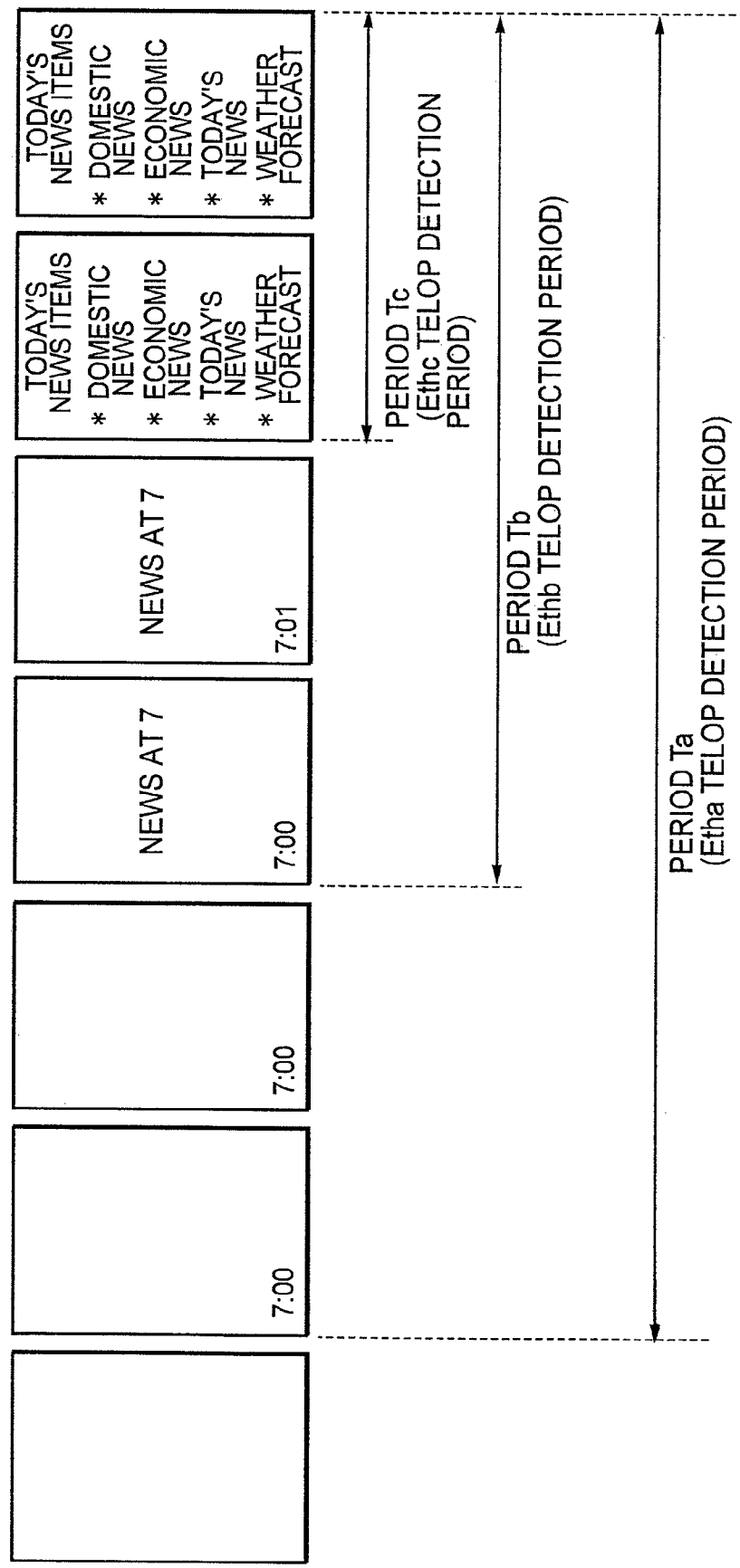
FIG. 12 is a diagram showing telop feature parameter adjustment in the second embodiment of the present invention.

FIG. 12 is the conceptual diagram showing telop feature parameters. Examples of the telop detection parameters are Etha, Ethb, and Ethc that are the threshold values of the number of detection edges.

For example, if the telops are displayed on the screen as shown in FIG. 12, the telop detection period is determined according to the detection value. If the setting parameter is Etha, the period Ta is determined to be the telop detection period.

Similarly, if the setting parameter is Ethb, the period Tb is determined to be the telop detection period. If the setting parameter is Ethc, the period Tc is determined to be the telop detection period.

(2) Operation Flowchart

Figure 14:
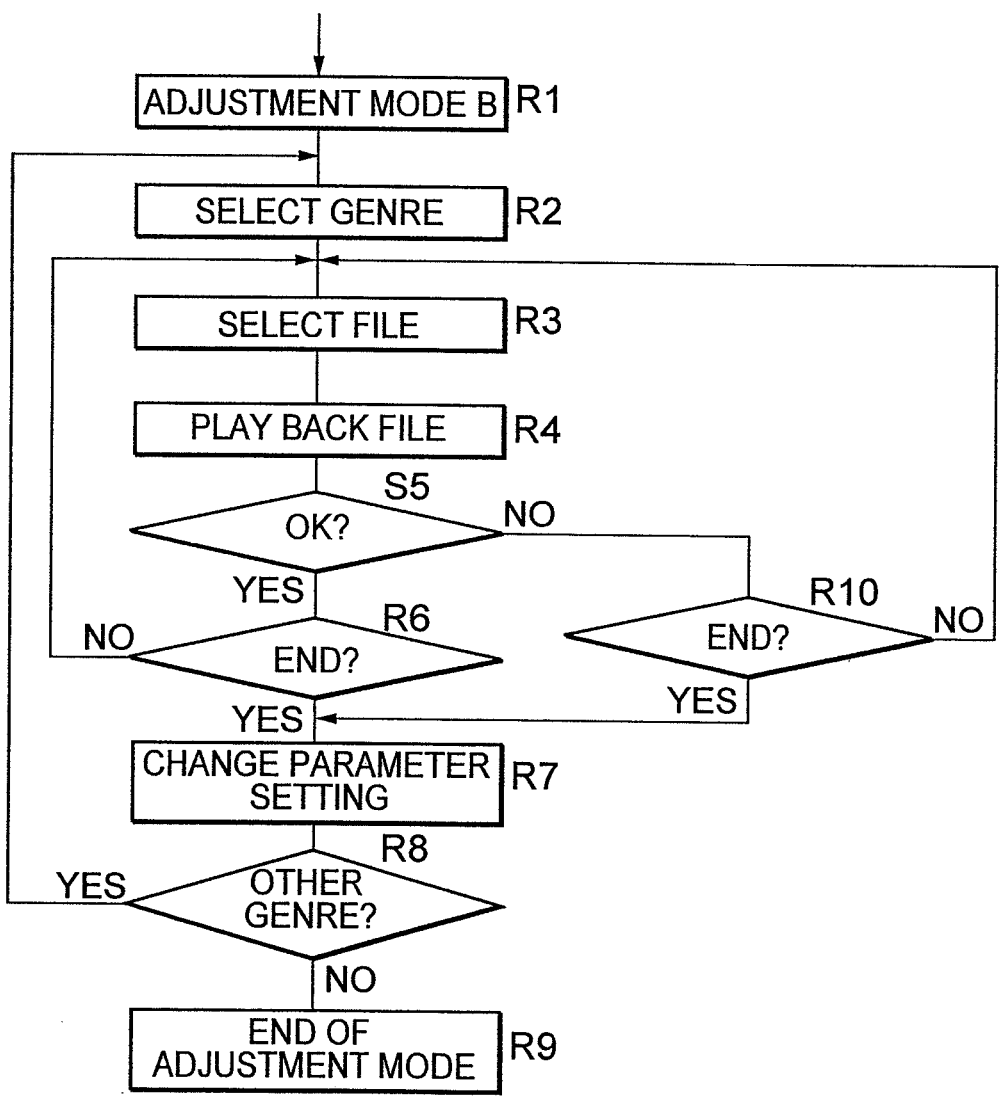
FIG. 14 is a flowchart showing the operation in the adjustment mode in the second embodiment of the present invention.

FIG. 13 and FIG. 14 are an example of the operation flowchart in the adjustment mode of this application.

(Example of Operation Flow of Network Connection Adjustment Mode)

The operation starts in step S20, and the operation mode is selected in step S21. Control is passed to the adjustment mode in step S22 if the mode is the adjustment mode; control is passed to a predetermined operation mode selected by the user if the mode is not the adjustment mode.

In the adjustment mode, the mode is changed automatically to the network connection adjustment mode by priority or according to the initial setting of the system setting that is set by the user for this apparatus. The predetermined network connection operation is performed and, in step S23, whether or not the network has no problem is checked.

If the recording/playback apparatus cannot be connected to the network because the network cable is not connected, the apparatus has a problem, or there is another problem, the mode is changed to the adjustment B mode, which will be described later, in step S29.

If the recording/playback apparatus is connected to the network, an attempt is made to connect the apparatus to the predetermined parameter adjustment site in step S24 and determines if the apparatus is connected in step S25.

If it is found that the apparatus is connected in step S25, control is passed to step S30, and if the apparatus is not yet connected, the apparatus enters the waiting state until connected in step S26.

Whether the apparatus waits to be connected or ends the connection is determined in step S27. If the apparatus waits to be connected, control is returned to step S26 to continue the wait state. If the apparatus ends the connection, control is passed to step S29 and the apparatus moves to the adjustment B mode that will be described later.

When the apparatus is connected to the predetermined adjustment site, the user selects the program genre to be adjusted in the predetermined home page in step S30 and then selects the file to be played back in step S31.

The video/audio file selected for adjustment is either played back in the streaming mode or downloaded and played back in step S32. Whether the digest playback (summary playback) information produced during the playback satisfies the requirement is checked in step S33.

If it is found that the information does not satisfy the requirement, whether to end the adjustment of the genre is checked in step S39. When it is desired to continue the adjustment, control is passed back to step S31, a file is selected, and the adjustment is continued.

If it is found that the file satisfies the requirement in step S33, whether to end the adjustment of the genre is checked in step S34. If the adjustment is not ended, control is passed to step S31 again and a file is selected and the adjustment is continued.

If the adjustment is ended in step S34, the predetermined parameter series corresponding to the selected file is downloaded in step S35.

If it is found that the adjustment is ended in step S39, the predetermined parameter series corresponding to the file played back last in the adjustment genre is downloaded in step S35.

The predetermined parameter series downloaded in step S35, which includes the predetermined adjusted parameter, is used as the updated parameter of the predetermined feature extraction processing unit or the play list generation unit in step S36.

Whether to adjust some of the other program genre is checked in step S37. If some of the other program genre is to be adjusted, control is passed back to step S30 to continue the adjustment. If no other program genre is to be adjusted, the adjustment mode is ended in step S38 and the established network connection is released automatically.

(Example of Operation Flow of Adjustment Mode not Through Network Connection)

When the control is passed to the adjustment B mode in step S29, the mode is the parameter adjustment mode not through network connection.

The mode is set to the parameter adjustment mode (adjustment B mode) not through network connection in step R1, the program genre to be adjusted is selected in step R2, and then the file to be played back is selected in step R3.

The file selected for adjustment is played back in step R4 and then the user checks whether the file satisfies the requirement in step R5.

If the file satisfies the requirement, the adjustment of the genre is ended in step R6 and the parameters corresponding to the file are changed and set in step R7.

Whether or not some of the other program genre is to be adjusted is checked in step R8. If no other genre is to be adjusted, the adjustment mode is ended in step R9. If some of the other program genre is to be adjusted, control is passed to step R2 to continue the adjustment.

If the playback file is not a desired file in step R5, whether or not the adjustment is to be ended is checked in step R10. If the adjustment is not ended but continued, control is passed back to step R3, the file is selected again, and the adjustment is continued.

In the adjustment B mode described above, only the second parameter adjustment, which is play list playback period selection processing, may be performed to simplify the configuration of the adjustment unit.

In the network connection adjustment, it is also possible to configure the apparatus in such a way that the configuration of the apparatus itself remains simple by configuring the system so that the adjustment differs according to the adjustment mode, for example, by using more program genres than those in the adjustment B mode or providing the ability to make a fine adjustment.

[Third Embodiment]

Next, an information signal playback apparatus that can implement an information signal playback method in a third embodiment of the present invention will be described with reference to the drawings. (Like reference numerals are used for the same components as those of the first embodiment and their descriptions are omitted).

The information signal playback apparatus in the third embodiment of the present invention plays back various types of data from a recording medium in which featured data, which is extracted from the predetermined video/audio data, image data, or audio data, is recorded in the predetermined area of the recording medium in which the video/audio data described above is recorded.

A predetermined summary period (digest playback period) is determined for the above-described video/audio data recorded in the above-described recording medium according to a predetermined rule based on the featured data described above and initialization parameter data that is previously set.

The user sets the mode to the digest playback mode and plays back the digest by sequentially skipping play back the digest playback periods. The user views the playback and, if a user-desired playback period is not played back or the user does not want to play it back any more, the user can change the predetermined parameters described above to change the digest playback.

The third embodiment of the present invention will be described with reference to the drawings in the sequence given below.

Figure 15:
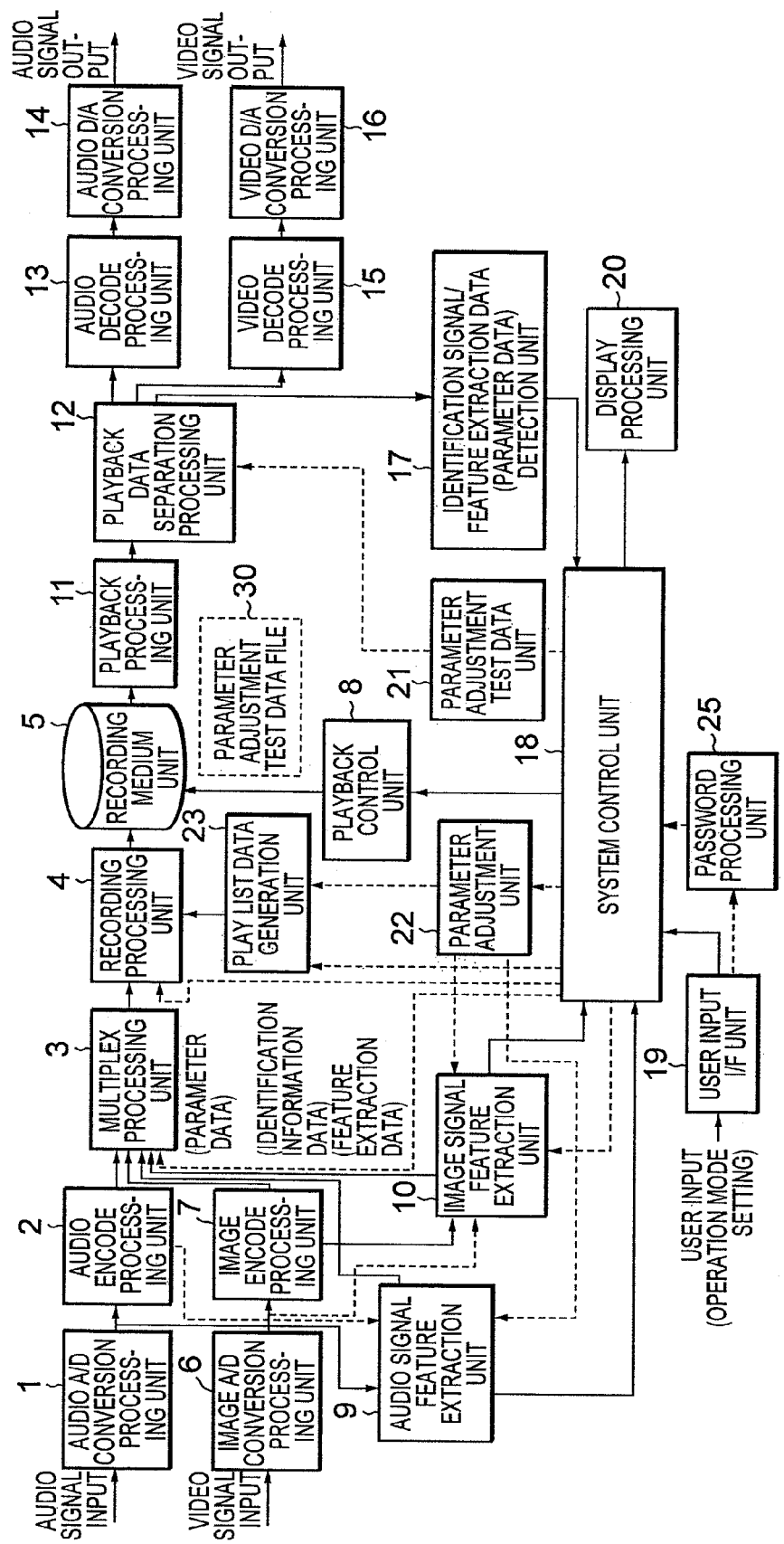
FIG. 15 is an example of the general block configuration of an information signal playback apparatus in a third embodiment of the present invention.

(1) Example of block configuration
(2) Operation flowchart (1) Example of Block Configuration FIG. 15 is an example of the general block configuration of a recording/playback apparatus to which the present invention is applied. Like reference numerals are used for the same components as those of the configuration shown in FIG. 1 and their descriptions are omitted. The configuration generally comprises those common components and a password processing unit 25.

Figure 16A:
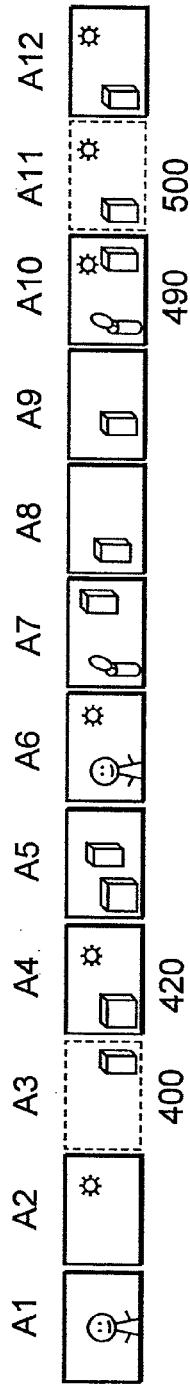
FIGS. 16A to 16C are diagrams showing an example of a parameter adjustment mode screen in the third embodiment of the present invention.
Figure 16B:
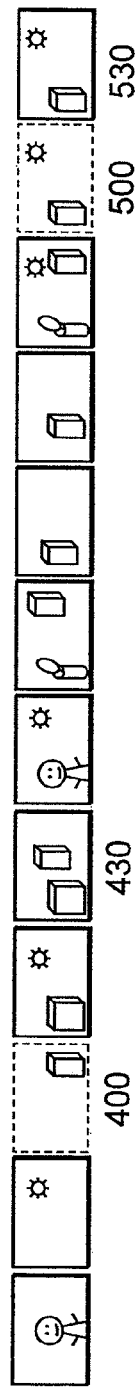
Figure 16C:
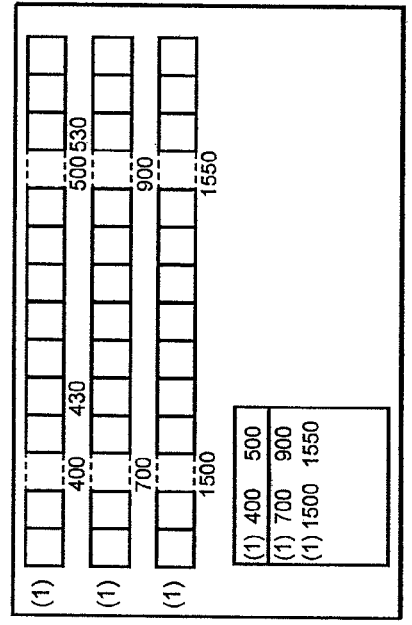

FIGS. 16A to 16C are examples of display in the parameter adjustment mode according to the present invention. When the mode is changed to the adjustment mode via the user input I/F unit 19, the images near the digest playback start frame and the end frame at a particular time in the play list are displayed in thumbnail format on a time-series basis as shown in FIG. 16A.

For example, to adjust the skip playback period of frames 400 to 500 in the top row of the play list data shown in FIG. 3, the operation unit such as a remote control is used to specify this play list data. The predetermined image scenes in the period of frames 400-500 are displayed in thumbnail format on a time-series basis as shown in FIG. 16A.

In this case, it is possible to display the play list data in FIG. 3 in the same screen image as that of the thumbnail images as shown in FIG. 16C. It is also possible to display the data part of the adjusted play list period by enclosing it by solid lines or by using a predetermined color, as shown in FIG. 16C.

When the predetermined parameter adjustment is made using an operation unit such as a remote control, the digest playback start frame and the end frame move according to the adjustment as shown in FIGS. 16A and 16B, and the outer frame (display frame) of a thumbnail display is displayed by enclosing it with a line of a predetermined width or by using a predetermined color.

In the example in FIGS. 16A to 16C, the thumbnail display frame of the digest playback start frame and the end frame, which are determined according to the initialization parameters or the current setting values, is indicated by a thick dotted line. It is also possible to display a frame number and a thumbnail image at the same time with the correspondence established between them or to display a frame number as well as a time indication. It is also possible not to display frame numbers and times according to the user operation status, for example, when the display screen image becomes confused.

As described above, the change in the digest playback start frame and the digest playback end frame can be easily understood as the parameters are adjusted. Thus, the user can adjust parameters to suit his or her preference.

The user can also use a password to individually set his or her own parameters. This makes it possible for the user to play back a digest desired most by the user in the frequently viewed genre.

The initialization parameters that are set in advance are prepared so that the contents of the digest playback satisfy the requirement of many users on average. Therefore, setting the parameters for each user allows a more efficient system to be provided to the user.

To set individual parameters, the user uses an operation unit such as a remote control to perform a predetermined operation, such as predetermined password setting or predetermined user registration, in the operation mode of a predetermined operation via the user input I/F unit 19.

In this case, password data inputted from the operation unit such as a remote control is inputted to the password processing unit 25 via the user input I/F unit 19 and authentication setting is performed for each user.

To perform predetermined parameter adjustment processing in the parameter setting mode, the system control unit 18 performs predetermined processing, such as determination processing, corresponding to the registered password to adjust parameters and set data for each user.

In the digest playback mode, user's predetermined password and registration information data are inputted via an operation unit such as a remote control, predetermined data is inputted to the system control unit 18 via the user input I/F unit 19, and predetermined determination processing such as authentication processing is performed.

Then, the parameter adjustment unit 22 is controlled by the signal from the system control unit 18, and the predetermined parameters prepared for the user is set for the image signal feature extraction unit 10, the audio feature extraction unit 9, and the play list data generation unit 23.

The first parameter series adjustment for the image feature extraction unit 10 and the audio feature extraction unit 9 is efficient for recording a new broadcast program belonging to a predetermined program genre. The second parameter series adjustment for the play list data generation unit 23 is efficient when the parameters of a predetermined program, from which the features are already extracted, are adjusted during the digest playback and the program is played back again or, after adjusting the parameters, the part of the program not yet played back is played back. In addition, the second parameter series adjustment is efficient when the digest of another program belonging to the same genre is played back.

The adjustment files are prepared for each program genre as shown in FIG. 7 to allow the user to adjust parameters for each genre. In the parameter adjustment mode, the thumbnails such as those shown in FIG. 7 are displayed as described above. They can also be played back as moving images to allow the user to confirm the parameter setting for normal playback or to confirm how the digest is played back after parameter adjustment.

The files used for parameter adjustment may be prepared in the parameter adjustment test data unit 21 in FIG. 15 or recorded in the predetermined area of the recording medium unit 5 as a parameter adjustment test data file 30.

For example, in the adjustment mode in which the first parameter series is adjusted, the individual setting data of the predetermined parameter series, such as the predetermined threshold value Ath used in audio feature processing, Eth used in telop feature processing, and the like, are variably adjusted by the predetermined operation unit such as a remote control while viewing the adjustment mode screen image in FIG. 16C described above.

In the adjustment mode in which the second parameter series is adjusted, the selection period method of play list generation processing described in FIG. 6 is adjusted by switching among parameters (6a), (6b), and (6c) while viewing the adjustment screen image shown in FIG. 16C described above.

(2) Operation Flowchart
(Parameter Adjustment Mode)

Figure 17:
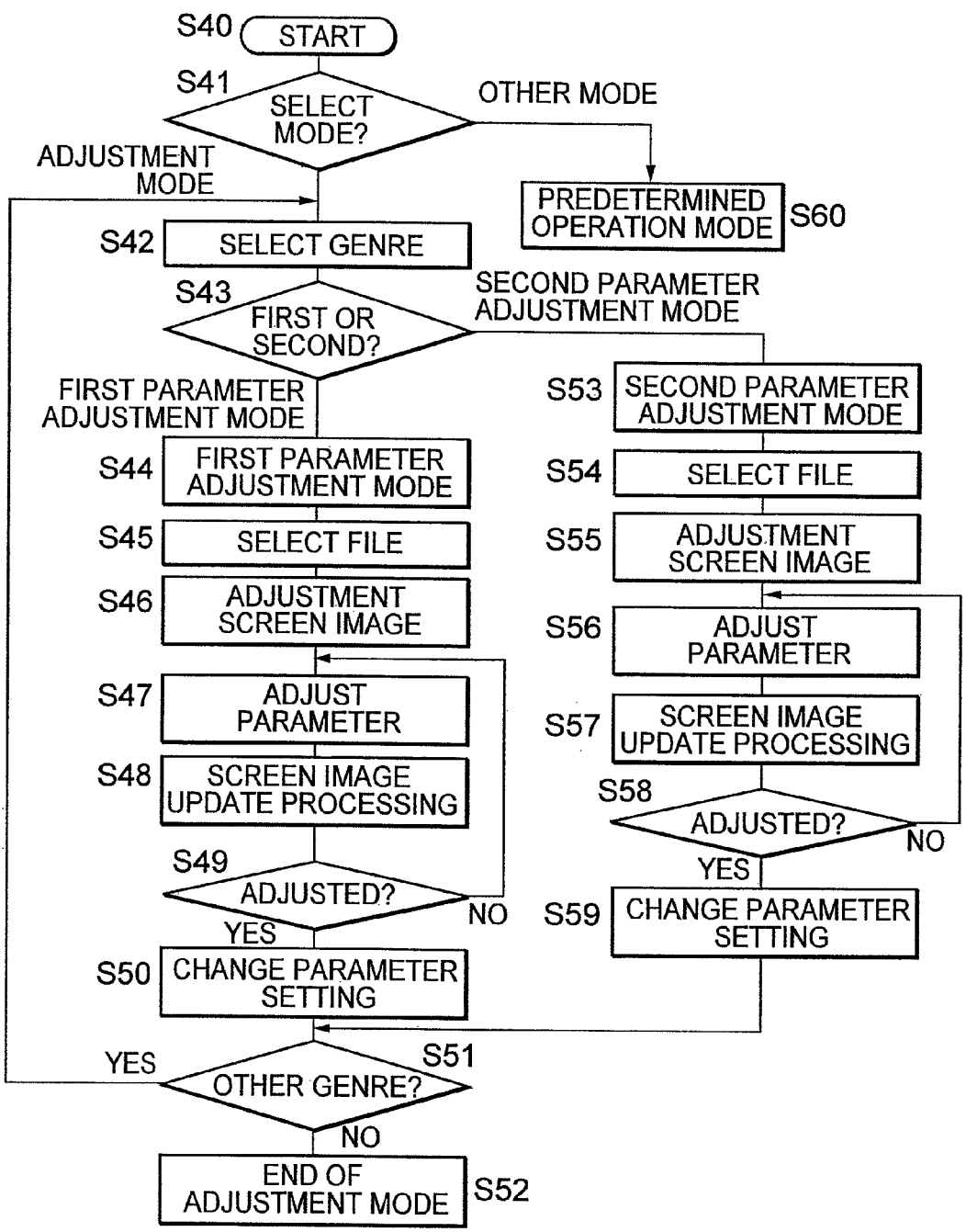
FIG. 17 is a flowchart showing the operation in the adjustment mode in the third embodiment of the present invention.

FIG. 17 shows an example of the operation flowchart in the adjustment mode. The operation starts in step S40. Whether the mode is the adjustment mode is checked in step S41. If the mode is the adjustment mode, control is passed to step S42. If the mode is not the adjustment mode, the mode is changed to a predetermined operation mode in step S60.

A program genre to be adjusted is selected in step S42. Whether the first parameter series is set to the adjustment mode or the second parameter series is set to the adjustment mode is selected in step S43.

If the first parameter series adjustment mode is selected, control is passed to the routines following step S44. If the second parameter adjustment mode is selected, control is passed to the routines following step S53.

Because the processing routines in the second parameter series adjustment mode in steps S53-S59 perform operation processing in the same manner as those of the first parameter series adjustment routines in steps S44-S50, the following describes the first parameter series processing routines.

The mode is changed to the first parameter series adjustment mode in step S44, and a file is selected in step S45. It is possible to perform the processing of step S45 after step S42. It is also possible to perform the processing of step S54 in the second parameter series adjustment mode immediately after step S42.

The adjustment screen image is displayed in step S46, the predetermined parameter adjustment is made in step S47, and the adjustment screen display is updated in step S48.

Whether the adjustment satisfies the requirement is checked in step S49. If the adjustment is to be continued, control is passed back to S47 to continue the adjustment. If the adjustment of the parameters satisfies the requirement, control is passed to step S50 and the parameters are set for use in the predetermined feature extraction processing units.

Whether some of the other program genre is to be adjusted is selected in step S51. If some of the other genre is to be adjusted, control is passed back to step S42; if no other genre is to be adjusted, control is passed to step S52 and the adjustment mode is ended.

(User Registration Parameter Adjustment Mode)

Figure 18:
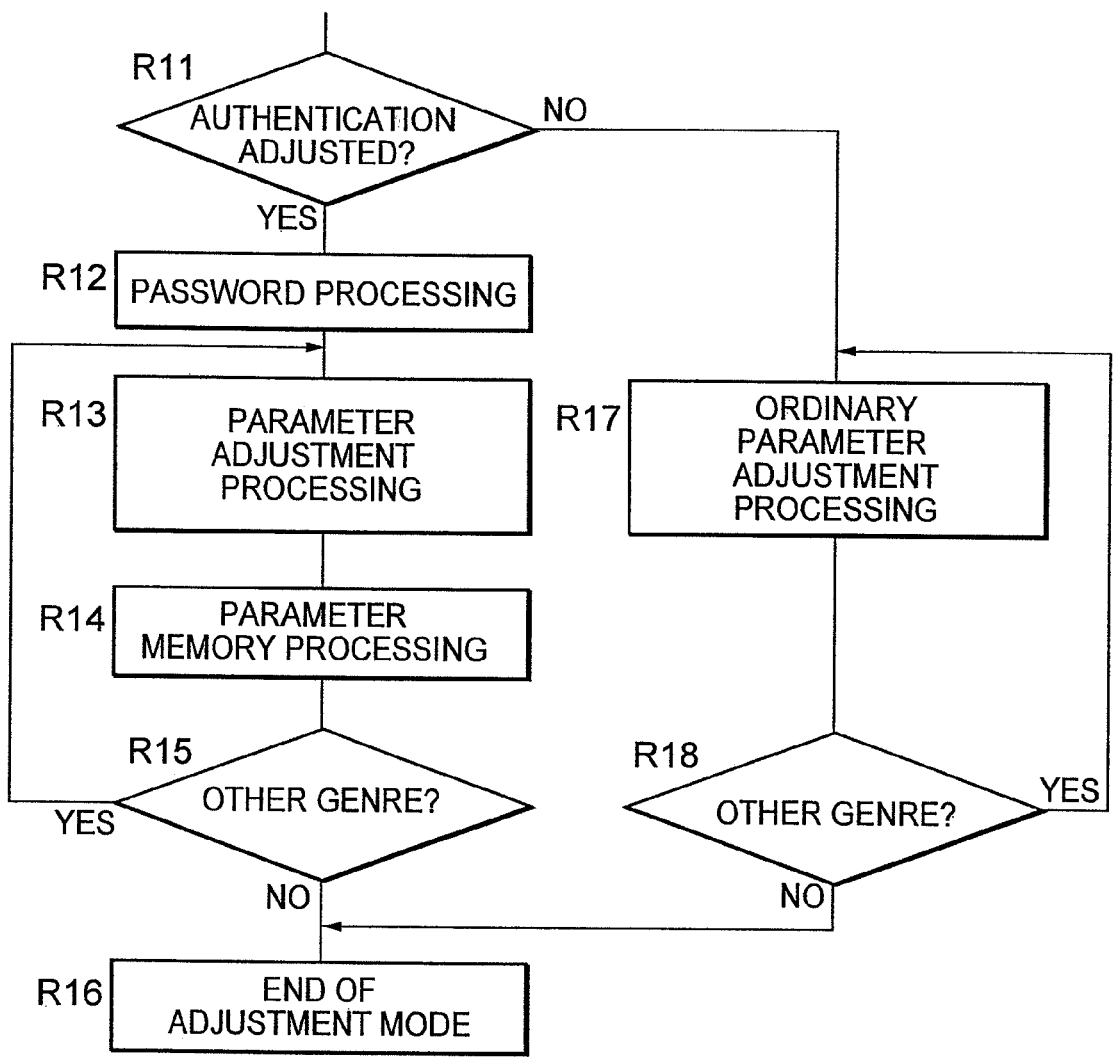
FIG. 18 is a flowchart showing the operation in the adjustment mode in the third embodiment of the present invention.

FIG. 18 shows an example of the adjustment mode operation flowchart when the user is authenticated and the parameters are adjusted for each user.

Whether user registration/authentication is to be performed is selected in step R11. If registration/authentication is performed, control is passed to step R12, the predetermined password processing is performed, and the registration processing or the authentication processing is performed. If registration/authentication is not performed, control is passed to step R17 and the predetermined processing is performed in the normal adjustment mode described above.

The predetermined parameter adjustment processing in steps S42 to S50 or steps S42 and S53 to S59 described above is performed in step R13.

Whether some of the other program genre is to be adjusted is selected in step R15. If the processing is performed, control is passed back to step R13 to continue the adjustment.

(Authentication Digest Playback Mode)

Figure 19:
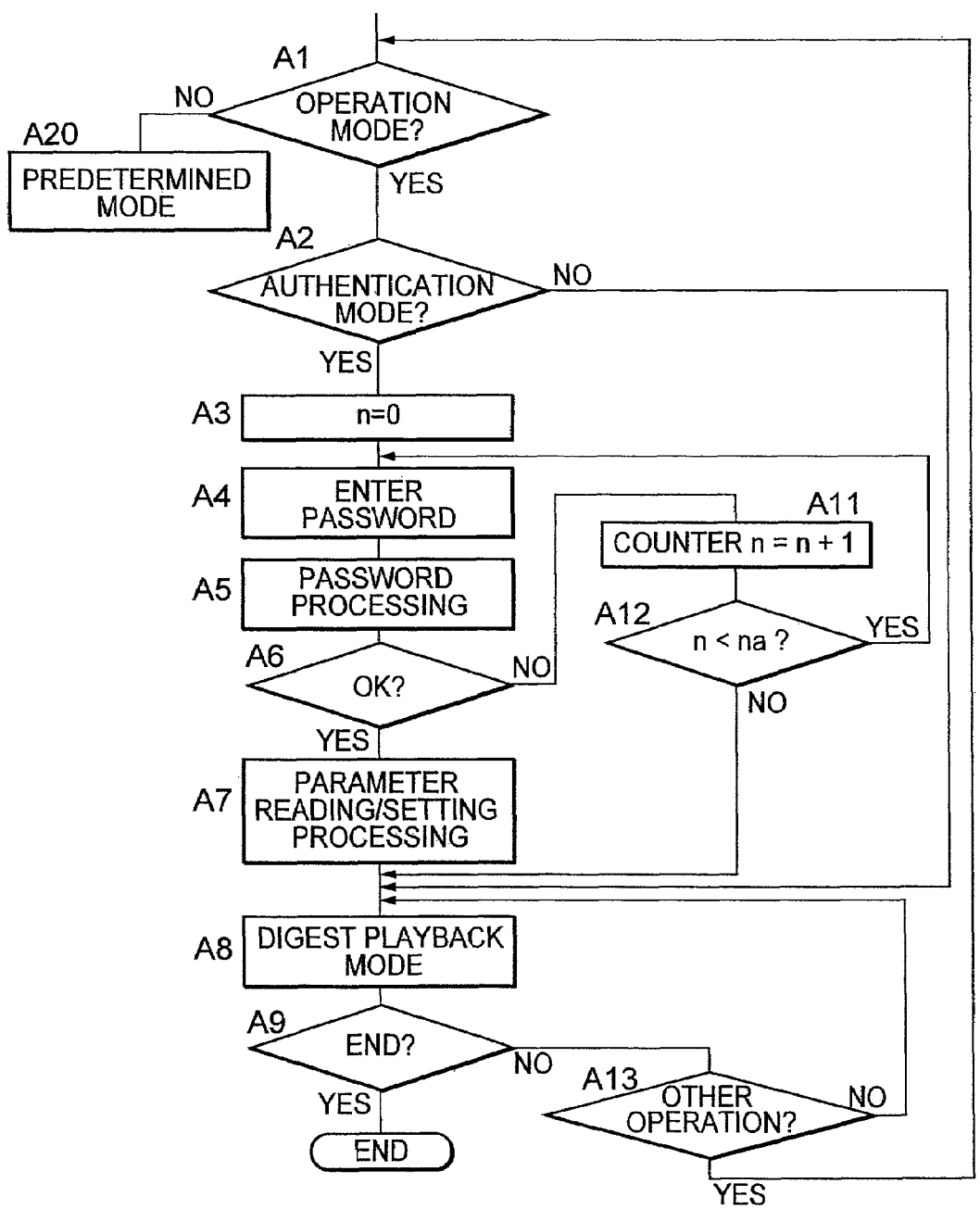
FIG. 19 is a flowchart showing the operation in the authentication digest playback mode in the third embodiment of the present invention.

FIG. 19 shows an example of the operation flowchart in the user authentication digest mode. To simplify the description of this mode, it is assumed that the user registration parameters are already set.

The operation mode is selected in step A1. If the digest playback mode is selected, control is passed to step A2. If some of the other mode is selected, control is passed to step A20 where the mode is changed to the predetermined operation mode.

Whether the authentication digest playback mode is to be used is selected in step A2. If the authentication mode is selected, control is passed to step A3 and the password input counter is initialized and the predetermined password is inputted in step A4.

If information data other than the password is used as user identification data, it is possible to input that data. In that case, it is assumed that the user is registered and the parameters are adjusted and set, using such information data also in the parameter adjustment mode.

The predetermined password processing such as the authentication processing and the data matching processing is performed in step A5. If the input information is correct in step A6, control is passed to step A7; if the input information is not correct, control is passed to step A11 and the counter is incremented by one.

Whether the counter value is equal to or less than the predetermined value is checked in step A12. If the value is equal to or less than the predetermined value, control is passed back to step A4 to allow the user to input information such as the password information again.

If it is found that the user's input password information is correct in step A6, the predetermined parameter series stored in the predetermined memory and adjusted by the user is read in step A7 and is set in the predetermined play list generation processing unit.

In step A8, the play list data is generated using the parameters, and the predetermined digest is played back according to the data.

If the normal digest playback mode that is not the authentication mode is selected in step A2 or if it is found that the counter value is equal to or larger than the predetermined counter value in step A12, the parameters are not changed. In step A8, the predetermined digest playback operation is performed using the initialization parameters or the last-set parameters.

When the operation is executed using the initialization parameter values or the last-set parameter values, the predetermined digest playback is performed using the already-processed play list data.

Whether to end the operation is selected in step A9. When the operation is to be ended, control is passed to next step and the operation is ended, and if the operation is not to be ended, whether the mode is changed to some of the other operation mode is selected in step A13.

When the mode is changed to some of the other mode, control is passed back to step A1 to allow the user to select the operation mode. If the digest playback operation is continued, control is passed back to step A8 to continue the digest playback mode.

(Authentication/Registration Feature Extraction Mode)

Figure 20:
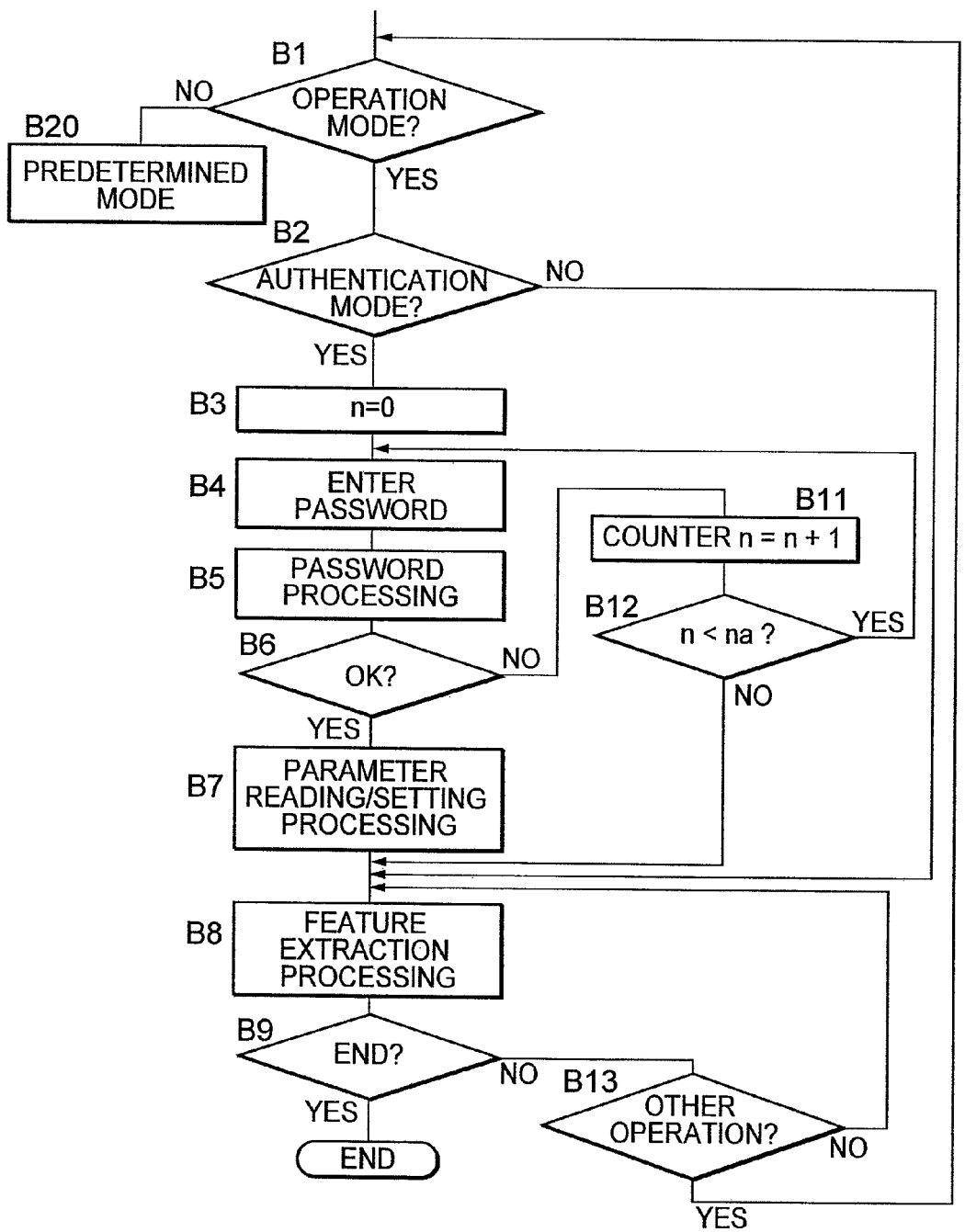
FIG. 20 is a flowchart showing the operation in the authentication feature extraction mode in the third embodiment of the present invention.

FIG. 20 shows an example of the operation flowchart in the user authentication digest mode. To simplify the description of this mode, it is assumed that the user registration parameters are already set.

When video/audio information on a broadcast program is recorded, the features are extracted at the same time the information is recorded. If there is a file in which a program is recorded, only the features can be extracted. Although the following describes the processing in which there is a file in which a program is recorded and only the features are extracted for the simplicity of the description, it is also possible that the processing described below is performed in the recording mode at the same time.

The operation mode is selected in step B1. If the feature extraction mode is selected, control is passed to step B2, and if some of the other mode is selected, control is passed to step B20 to change mode to the predetermined operation mode.

Whether the mode is the authentication feature extraction mode is selected in step B2. If the mode is the authentication mode, the password input counter is initialized in step B3 and the predetermined password is inputted in step B4.

If information data other than the password is used as user identification data, it is possible to input that data. In that case, it is assumed that the user is registered and the parameters are adjusted and set, using such information data also in the parameter adjustment mode.

The predetermined password processing such as the authentication processing and the data matching processing is performed in step B5. If the input information is correct in step B6, control is passed to step B7, and if the input information is not correct, control is passed to step B11 and the counter is incremented by one.

Whether the counter value is equal to or less than the predetermined value is checked in step B12. If the value is equal to or less than the predetermined value, control is passed back to step B4 to allow the user to input information such as the password information again.

If it is found that the user's input password information is correct in step B6, the predetermined parameter series stored in the predetermined memory and adjusted by the user is read in step B7 and is set in the predetermined image feature extraction processing unit and the audio feature extraction processing unit.

In step B8, the predetermined feature extraction processing is performed using the parameters that are set. If the normal feature extraction mode that is not the authentication mode is selected in step B2 or if it is found that the counter value is equal to or larger than the predetermined counter value in step B12, the parameters are not changed. In step B8, the predetermined feature extraction processing operation is performed using the initialization parameters or the last-set parameters.

Whether to end the operation is selected in step B9. When the operation is to be ended, control is passed to next step and the operation is ended, and if the operation is not to be ended, whether the mode is changed to some of the other operation mode is selected in step B13.

When the mode is changed to some of the other mode, control is passed back to step B1 to allow the user to select the operation mode. If the feature extraction operation is continued, control is passed back to step B8 to continue the feature extraction mode.

[Fourth Embodiment]

Next, an information signal processing apparatus that can implement an information signal processing method in a fourth embodiment of the present invention will be described with reference to the drawings.

The information signal processing apparatus in the fourth embodiment of the present invention plays back various types of data from a recording medium in which featured data, which is extracted from the predetermined video/audio data, image data, or audio data using the predetermined first parameter series, is recorded in the predetermined area of the recording medium in which the video/audio data described above is recorded.

A predetermined summary period (digest playback period) is determined for the above-described video/audio data recorded in the above-described recording medium according to a predetermined rule based on the featured data described above and the second parameter series data.

The user sets the apparatus to the digest playback mode and plays back the digest by sequentially skipping playback the digest playback periods. The user views the playback and, if a user-desired playback period is not played back or the user does not want to play it back any more, the user can change the first and the second predetermined parameter series described above to change the digest playback period.

In that case, the user plays back a recorded program file or an adjustment test file previously recorded and accumulated. The user performs the operation such as a double-speed playback, a reverse playback, or a pause via the operation unit such as a remote control and records the operation periods and operation state (playback operation mode). Then, the user can adjust and change the parameter data for playing back the digest using the operation periods and the operation state and the featured data corresponding to the periods. This allows the user to perform a desired digest playback.

Next, a fourth embodiment of the present invention will be described with reference to the drawings. Because the block configuration of the information signal processing apparatus in the fourth embodiment of the present invention is the same as that shown in FIG. 1 described in the first embodiment, the description of the configuration and the operation is omitted. Because the description of the recording processing block and the playback processing block which have the configuration described above and the description of the digest playback (summary playback) mode, the parameter adjustment mode, and the play list data are the same as those in the first embodiment, those descriptions are omitted. The following describes the adjustment mode.

Figure 21:
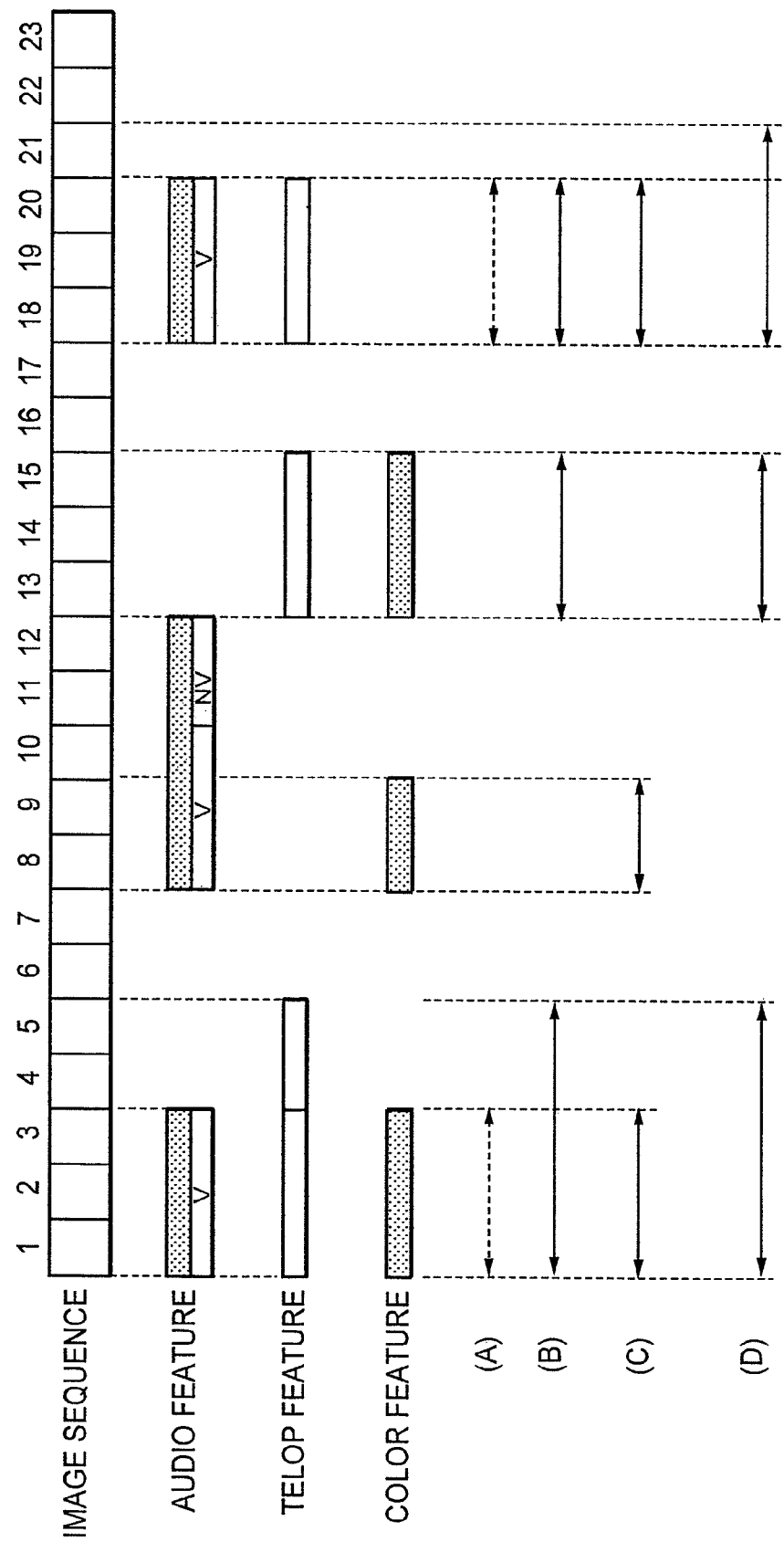
FIG. 21 is a diagram showing the adjustment mode of an information signal processing apparatus in a fourth embodiment of the present invention.

FIG. 21 is a conceptual diagram showing the adjustment mode. It is assumed that the feature extraction data processed according to the initialization parameters are made to correspond to the predetermined periods of the predetermined image sequence as shown in the figure where the image sequence is numbered 1, 2, 3, and the like.

It is assumed that a news program is adjusted in the second parameter series adjustment mode and that file 1 of the program genre shown in FIG. 7 is used for adjustment. In the description below, the predetermined audio feature extraction data, the telop feature extraction data, and the color feature extraction data are used as the feature extraction data as shown in FIG. 21 for the sake of simplicity. Of course, it is also possible that similar processing operations may be performed including other feature extraction data, for example, camera features such as camera pan and zooming. Other program genres may also be adjusted in the same manner.

First, the second parameter adjustment mode will be described for convenience.

Assume that (A) in FIG. 21 shows a play list in the initialization state before the adjustment. That is, before the adjustment, a predetermined period including both the speaker's period and the telop period of the audio is the digest playback period and the start frame and the end frame of the skip playbacks in the period constitute the play list data.

Assume that the user performs operations such as a fast-forwarding and a pause during the predetermine operation in the adjustment mode via the operation unit such as a remote control and that the user plays back the period shown in (B) in FIG. 21 in normal mode but does not the other periods.

The playback control information from the user, such as a fast-forwarding, a pause, and a normal playback, is inputted from the user input I/F unit 19 to the system control unit 18 shown in FIG. 1. The predetermined playback processing is performed under the predetermined playback control by the playback control unit 8. The predetermined featured data is detected by the identification signal/feature extraction data detection unit 17 and is inputted to the system control unit 18.

The feature extraction data generated according to the predetermined parameter series and the play list data are associated as described in FIG. 6. Therefore, the featured data in the normal playback period is associated with the play list in the system control unit 18 under the playback control described above.

In (B) in FIG. 21, the user plays back the telop detection period in the normal mode and plays back the other periods through an operation other than the normal mode playback, for example, through a fast-forwarding. Thus, the parameter adjustment unit 22 is controlled by the signal from the system control unit 18, and the processing of the play list data generation unit 23 used for the second parameter series is adjusted and changed, so that the telop periods are played back by priority in response to the predetermined operation command from the user.

In (C) in FIG. 21, the speaker's audio period and the telop detection period or the speaker's audio period and the person (flesh color) detection period are played back in normal mode. As in the processing described above, the play list data generation unit 23 is adjusted by the parameter adjustment unit 22.

Next, the first parameter series adjustment mode is considered. For example, assume that the normal playback operation is performed as in (D) in FIG. 21.

In this case, though the telop detection period in (B) in FIG. 21 appears to be played back by priority, image sequence 21 is not determined as the telop detection period.

Based on the predetermined signal from the identification signal/feature extraction data detection unit 17 and the playback control command from the user input I/F unit 19, the system control unit associates the playback frame number with the predetermined feature extraction data to determine which feature period the user plays back by priority. The parameter series is adjusted so that predetermined processing is performed in the determined feature period.

In (D) in FIG. 21, the ratio of the period played back as the telop feature period out of three feature periods, that is, the audio feature period, the telop feature period, and the specific color feature period, is higher than that of the period played back as the other feature. Therefore, it is determined that the user plays back the telop feature period by priority.

That is, the playback periods that coincide with the audio feature periods are playback periods 1 to 3 out of 1 to 5, no playback period in playback periods 13 to 15 because there is no audio feature period, and playback periods 18 to 20 out of 18 to 21. Thus, the ratio is calculated as follows.

$$6/12=0.5$$

Similarly, FIG. 21 shows that the playback periods that coincide with the telop feature periods are playback periods 1 to 5 out of 1 to 5, playback periods 13 to 15 out of 3 to 15, and playback periods 18 to 20 out of 18 to 21. Thus, the ratio is calculated as follows.

$$11/12=0.92$$

Similarly, FIG. 21 shows that the playback periods that coincide with the color feature periods are playback periods 1 to 3 out of 1 to 5, playback periods 13 to 15 out of 13 to 15, and no coinciding playback periods in playback periods 18 to 21. Thus, the ratio is calculated as follows.

$$6/12=0.5$$

From the description above, it is determined that the user wants to play back telop features by priority. In this case, it is required that the predetermined change be made, for example, the threshold value Eth1 be reduced, by controlling the parameter adjustment unit 22 via the signals from the system control unit 18 and adjusting the parameters for the predetermined telop feature extraction processing executed via the image feature extraction unit 10 so that telops can be detected easily and image sequence 21 in FIG. 21 can be determined as the telop feature period.

As described above, what feature extraction processing parameters should be adjusted can be determined by finding the ratio of the coincidence between the periods played back by the user in normal mode and the feature periods of the parameters.

Although the start frame and the end frame of a playback period are determined automatically by a predetermined user command after a normal playback in the example described above, it is also possible to determine the frames by performing other operations such as a slow playback, a normal playback, and a pause and then operating predetermined buttons using a remote control and the like.

Because the user, who plays back information only in normal playback mode, sometimes fails to find the frames or finds it difficult to determine the frames accurately, it is also possible to determine the frames via the button operation or some other method as described above.

In this case, the adjustment file data may be a file that is several minutes long at the longest, and the picture size may be smaller than the normal size.

For example, if the picture size is 720×480 in the MPEG2 format during normal recording and playback, any of the normal picture size, a ¼ size that is about 180×120, or a still smaller size may be used. The transmission rate may also be about 2 to 10 Mbps that is lower than that of the normal recording and playback.

In the parameter adjustment mode, it is also possible to display the adjustment file as a sub screen image of a smaller picture size as described above while data is displayed in the normal playback mode. (FIG. 10)

[Fifth Embodiment]

Next, an information signal processing apparatus that can implement an information signal processing method in a fifth embodiment of the present invention will be described with reference to the drawings.

The information signal processing apparatus in fifth embodiment of the present invention will be described with reference to the drawings in the sequence given below.

Figure 22:
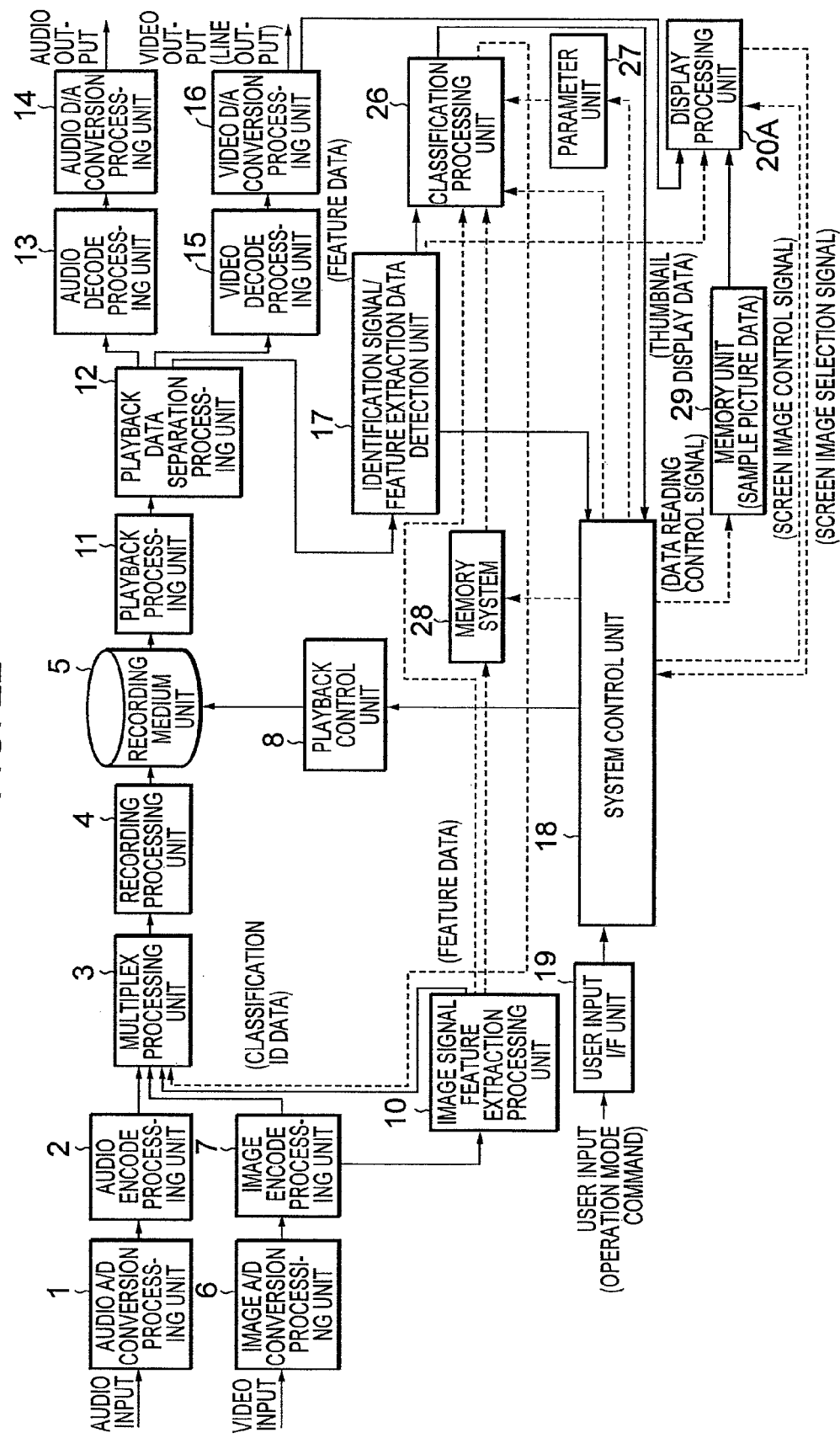
FIG. 22 is an example of the general block configuration of an information signal processing apparatus in a fifth embodiment of the present invention.

(1) Example of block configuration
(2) Operation flowchart
(1) Example of Block Configuration FIG. 22 is an example of the general block configuration when the fifth embodiment of the present invention is applied a recording/playback apparatus. Like reference numerals are used for the same components as those of the configuration shown in FIG. 1 and their descriptions are omitted. The configuration generally comprises those common components; a feature extraction unit 10 that extracts a feature part from the digital signal obtained by an image encode processing unit 7; a feature extraction data detection unit 17 that detects featured data separated by a playback data separation processing unit 12; a classifying processing unit 26; a system control unit 18 that controls the input of operation data from a user input I/F unit 19, the input of featured data from the feature extraction data detection unit 17, and a playback control unit 8; a display processing unit 20A that corresponds to image display means for reading and displaying image data under control of the system control unit 18; a memory unit 28 in which featured data is stored; a parameter unit 27; and a memory unit 29 in which sample picture data is stored.

The operation of the information signal processing apparatus with this configuration will be described below. A classifying processing block according to the present invention will be described later.

(Description of Recording Processing)

First, the operation of the processing block on the recording side will be described. First, the audio A/D conversion processing unit 1 converts an audio signal from analog to digital, and the audio encode processing unit 2 performs predetermined encode processing such as MPEG audio processing.

The video A/D conversion processing unit 6 converts a video signal from analog to digital, and the image encode processing unit 7 performs predetermined encode processing such as MPEG video processing.

A part of the predetermined signal outputted from the image encode processing unit 7 is inputted to the feature extraction unit 10, which performs predetermined feature extraction processing.

If the video encode processing is MPEG format video processing in this case, it is possible to output DCT coefficients as the feature extraction data.

The featured data outputted from the feature extraction unit 10 may also be stored in the memory unit 28 of the main body provided separately from the recording medium.

For example, only the DC coefficients of the DCT of an I-picture are stored in the memory. By performing classifying processing, which will be described later, for the data stored in the memory and reading the data from the memory for display processing, data can be played back faster than when data is played back from the recording medium.

Figure 24:
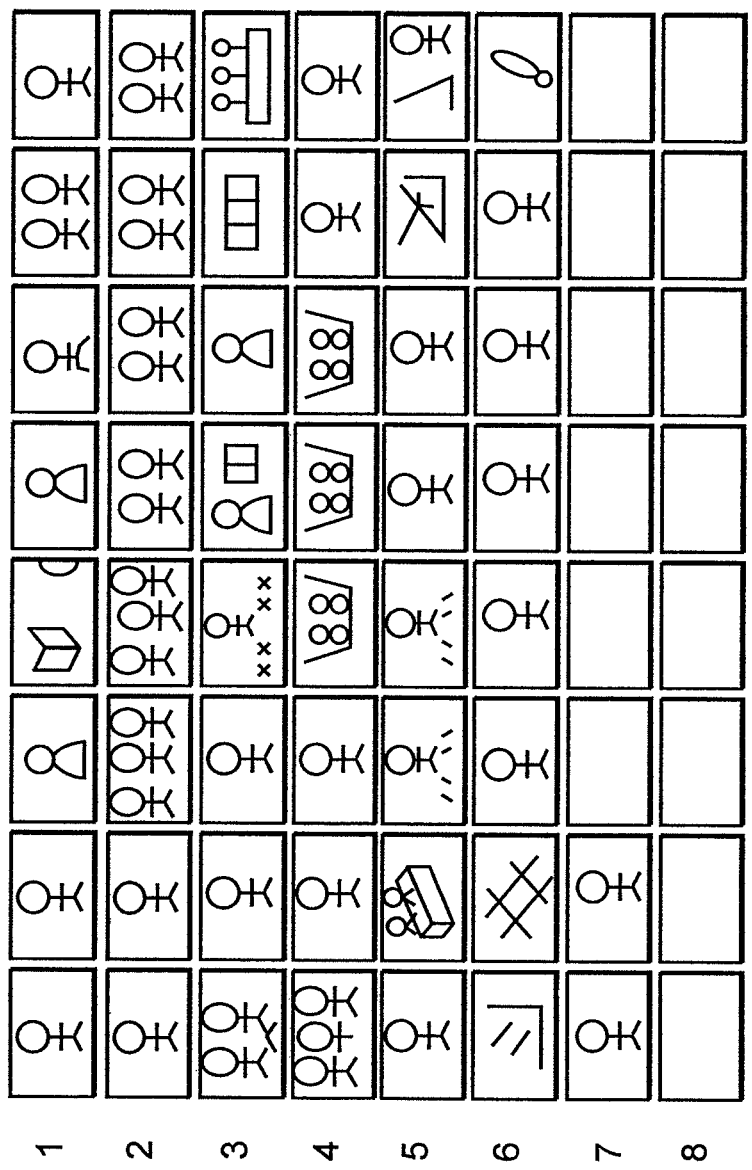
FIG. 24 is a diagram showing an example of the display of classifying processing images in the fifth embodiment of the present invention.

As will be described later, the image resolution is not a problem when the classifying processing is performed so that the thumbnails are displayed as shown in FIG. 24. Therefore, the DC coefficient data of the luminance signal (Y) and the color signal (Cb, Cr) of the DCT is converted to the RGB data and then the data is transformed into a predetermined size for displaying thumbnails.

The audio data and the image data for which predetermined encode processing is performed, as well as the identification ID data that will be described later, are inputted to the multiplex processing unit 3 that performs predetermined multiplex processing for the data. The data is recorded on the recording medium unit 5 after the predetermined recording processing by the recording processing unit 4.

The identification ID data can be generated while performing the recording processing. The data from the feature extraction unit 10 is inputted to the classifying processing unit 26 that will be described later and, after predetermined classifying processing, this identification ID data is outputted.

(Description of Playback Processing)

Next, the operation of the processing block on the playback side will be described. The playback processing unit 11 performs predetermined playback processing for the signal played back from the recording medium unit 5. After that, the playback data separation processing unit 12 classifies the data into audio data, image data, and featured data and outputs them.

The audio decode processing unit 13 performs predetermined decode processing for the audio data. The audio D/A conversion processing unit 14 performs predetermined D/A conversion processing for the decoded data and outputs the converted data as the audio signal.

The video decode processing unit 15 performs predetermined decode processing for the image data. The video D/A conversion processing unit 16 performs predetermined D/A conversion processing for the decoded data and outputs the converted data as the video signal.

(Description of Classifying Processing)

The feature extraction data detection unit 17 checks the separated featured data for detecting the DCT data that will be used for classifying processing and the DC coefficient data that will be used for thumbnail display after the classifying processing and outputs the detected data.

The classifying processing unit 26 performs the predetermined classifying processing using the parameter data from the parameter unit 27 and outputs the predetermined identification data.

For example, this identification data may be identification numbers that are assigned to the images that are determined to be similar through the predetermined processing, for example, through the processing disclosed in Japanese Laid-Open Patent JP2002-344872A and Japanese Laid-Open Patent JP2002-344852A. The identification data may also be assigned at the same time the data is recorded or when the data is played back.

When the identification data is assigned at the same time the data is recorded, the feature extraction data used for the classifying processing is serially recorded and classified according to the parameter data that is previously set. Thus, the user cannot view the result of the processing that is variably adjusted.

To allow the user to confirm the expected result of the classification or to obtain a result different from that produced before while the data is recorded or when the classifying processing is to be performed while the data is recorded, the apparatus reads sample images from the memory unit 29 under control of the system control unit 18 and displays the image on the display processing unit 20A to allow the user to set parameters while viewing the image thumbnail pictures.

That is, this memory unit 29 stores thumbnail picture data classified by changing several parameters. The user selects a desired classification group displayed on the display processing unit 20A using the predetermined operation unit such as a remote control and inputs the selection signal to the system control unit 18. The system control unit 18 sets and changes the predetermined parameters by controlling the parameter unit 27 so that the parameters corresponding to the user-selected image group are set.

FIG. 24 shows an example of thumbnail images produced as a result of the classifying processing. The images arranged horizontally belong to the same classification picture group produced as a result of the classifying processing. The numerals (1) to (8) indicate classification picture groups produced by changing the parameters.

When the user who performs the classifying processing at playback time wants to change the classification result, the user can read the featured data if it is recorded in the recording medium unit 5. Therefore, the user can change the parameters, perform classifying processing for a predetermined recorded program period, and view the classification result for each changed parameter as shown in FIG. 24.

Sometimes, there is a case in which the classifying processing is performed at recording time and the identification ID data is recorded but the featured data is not recorded. In that case, the information signal whose feature extraction data cannot be detected by the feature extraction data detection unit 17 is inputted to the system control unit 18 to allow the user to read sample pictures from the memory unit 29 for adjusting parameters.

In this case, the sample picture data for which the classifying processing was performed by varying the parameters is stored in the memory unit 29 for each classification genre. The user can select the sample image data in the adjustment mode using the predetermined operation unit such as a remote control for adjusting parameters for each genre.

(Example of Block Configuration of Classifying Processing Unit)

The classifying processing is disclosed in the well-known documents described above. The following describes an example of the modified block configuration to which the present invention is applied.

Figure 23:
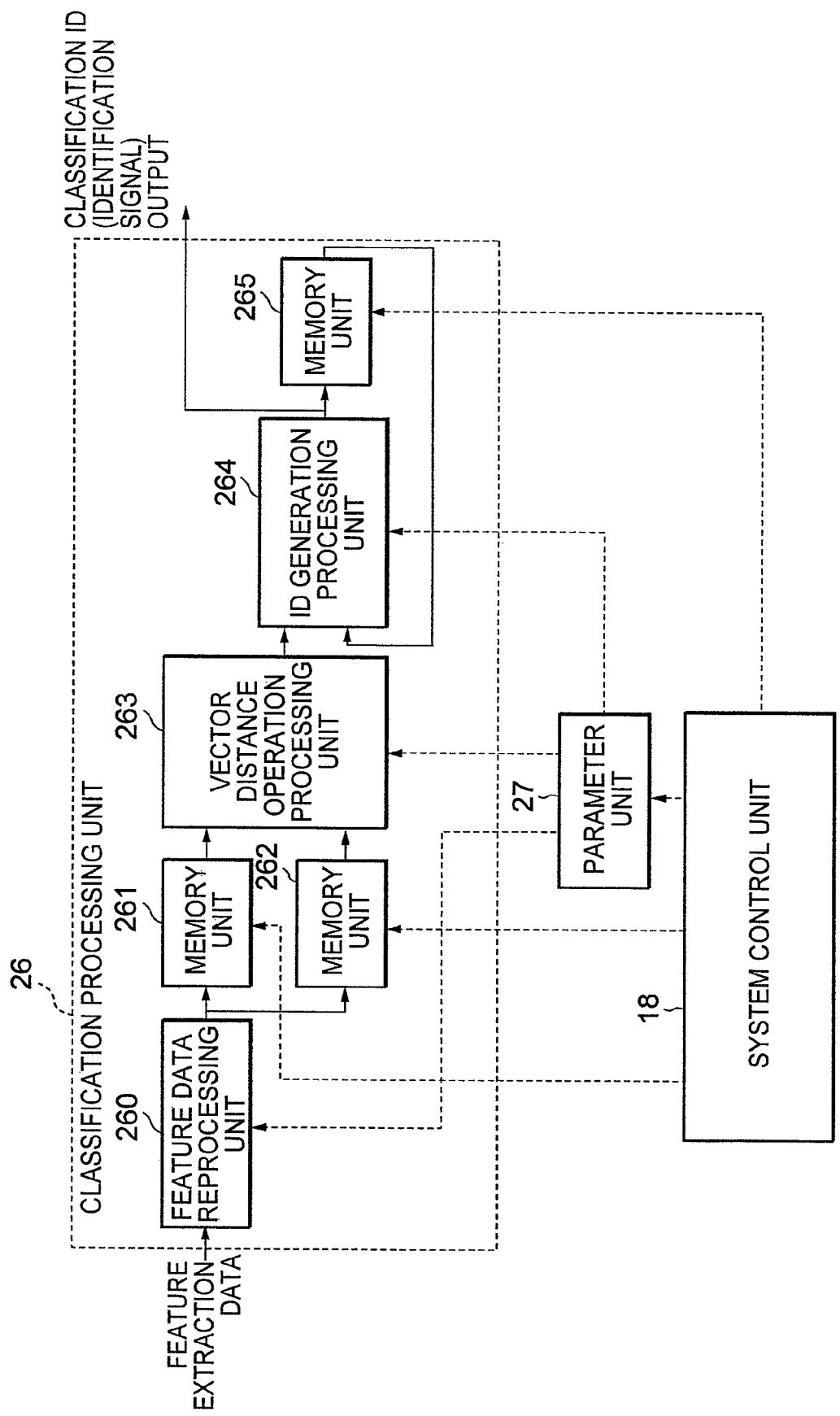
FIG. 23 is an example of the block configuration of a classifying processing unit in the fifth embodiment of the present invention.

FIG. 23 shows an example of the block configuration of the classifying processing unit 26. The classifying processing unit comprises a featured data reprocessing unit 260 that receives feature extraction data and processes the featured data; a memory unit 261 in which data from the featured data reprocessing unit 260 is stored; a memory unit 262 in which data from the featured data reprocessing unit 260 is stored; a vector distance calculation processing unit 263 that calculates the distance using the featured data stored in the memory units 261 and 262; an ID generation processing unit 264 that generates IDs; and a memory unit 265.

The classifying processing unit 26 having such a configuration first receives featured data from the image encode processing unit 7 via the featured data reprocessing unit 260.

After that, the featured data is inputted to the memory units 261 and 262 and the predetermined storage processing is performed. The data stored in the memory units 261 and 262 is read in the predetermined timing, inputted to the vector distance calculation processing unit 263, and the predetermined vector-to-vector distance between data is compared and calculated.

The memory unit 261 stores the featured data of an image frame (k) from which similarity is to be detected, while the memory unit 262 stores the featured data stored previously.

To detect which frame data stored in the memory unit 262 and at a particular time, is closest to the data read from the memory unit 261, the data is serially read from the memory unit 262. Then, the vector distance calculation processing unit 263 performs the predetermined processing for the data.

As described above, the DCT coefficients of the luminance signal (Y signal) and the color signal (Cb, Cr signal) can be used for the featured data. The average value of the areas is used as the featured data so that the data corresponds to the 25 areas, for example, shown in FIG. 25(A).

That is, Y, Cb, and Cr are 25-order vectors. The vector distance calculation processing unit 263 calculates the 25-order vector-to-vector distances and detects to which frame of the featured data stored before that point, the calculated distance is closest.

After that, the ID generation processing unit 264 compares the vector distance with the predetermined threshold value Th. If the vector distance is smaller than the predetermined threshold value, the ID generation processing unit 264 reads the ID data ID (n) corresponding to frame n, which is the frame whose vector distance is closest as described above, from the memory unit 265, outputs the same ID data ID (n), and stores the ID data on the frame in the memory unit 265.

That is, ID (k) is stored in the memory unit 265 with ID(k)=ID(n) because the current frame is k.

If the ID generation processing unit 264 finds that the vector distance is larger than the predetermined threshold value Th, the ID generation processing unit 264 detects the maximum value of the data stored in the memory unit 265, designates IDa+1, generated by adding 1 to the maximum value IDa, as the ID data ID(k) of the frame calculated immediately before, and stores the ID data ID(k) in the memory unit 265. That is, ID(k)=IDa+1 in this case.

The frame pictures with the same ID data can be determined to be similar images by serially performing the above processing for the image frames. The classifying processing is performed using those IDs.

The memory unit 265 stores data whose value is 0 in all memory areas as the initial data. The similarity detection signal processing such as the one described above is performed and, if the value is larger than the predetermined threshold value Th as described above, the value is incremented by 1 and, if the value exceeds the maximum value IDmax of the ID, the value is set to 0.

The similarity detection processing, in which vector calculation is performed as described above, does not have to be performed for all frames but is required to be performed only for each I-picture of MPEG format video data.

Assume that an I-picture occurs every 15 frames and the playback rate is 30 frames/second. Then, processing is performed every 0.5 second. For example, even if no similarity is detected for 10 hours, the ID is increased as follows:

10(hours)×3600(seconds)×0.5=18000

The number of bits for the ID can be kept to a minimum because 15 bits are enough.

Now, consider that the featured data reprocessing unit 260 reprocesses the featured data, such as the DCT coefficients corresponding to screen areas 1-25 generated by dividing the screen into 25 as shown in FIG. 25(A), so that the featured data corresponds to the screen areas such as the one shown in FIG. 25(B).

Because the screen is divided into five areas in FIG. 25(B), the feature amount is coarser than that of the screen in FIG. 25(A) that is divided into 25 areas. The featured data $1b$ to $5b$ in FIG. 25(B) is reprocessed using the featured data $1a$ to $25a$ in FIG. 25(A) as follows:

$1b=(1a+6a+11a+16a+21a)/5$ $2b=(2a+7a+12a+17a+22a)/5$ $3b=(3a+8a+13a+18a+23a)/5$ $4b=(4a+9a+14a+19a+24a)/5$ $5b=(5a+10a+15a+20a+25a)/5$

The featured data $1c$ to $9c$ in the screen areas shown in FIG. 25(C) is reprocessed in another method as follows:

$1c=(1a+2a+6a+7a)/4$ $2c=(3a+8a)/2$ $3c=(4a+5a+9a+10a)/4$ $4c=(11a+12a)/2$ $5c=(7a+8a+9a+12a+13a+14a+17a+18a+19a)/9$ $6c=(14a+15a)/2$ $7c=(16a+17a+21a+22a)/4$ $8c=(18a+23a)/2$ $9c=(19a+20a+24a+25a)/4$

The predetermined areas are selected and the average value is calculated as described above. The method for calculating the average value is not limited to the example described above but any method may be set.

Instead of the method in which the average value is calculated, some of the other method is also possible in which only the even-numbered components or odd-numbered component of the 25 vector components are used as the featured data. For example, assume that the original vector a' is a 25-order vector, then a'=(1a, 2a, 3a, 4a, - - - , 25a).

The vector of only the even-numbered components is a 12-order vector, then ae'=(2a, 4a, 6a, - - - , 24a).

The vector of only the odd-numbered components is a 13-order vector, then ao'=(1a, 3a, 5a, - - - , 25a).

Processing the featured data in this way allows similarity in a wide allowable range to be detected in the similarity comparison processing that will be described later. That is, the classification result can be changed by performing the processing such as the one described above and performing the classifying processing with the resulting data as the featured data.

In addition, the classification result can be changed by changing the threshold value Th used in the ID generation processing unit 264 described above.

That is, the allowable range becomes wider as the threshold value Th is increased, and the allowable range becomes narrower as the threshold value Th is decreased, so that the featured data is classified into frames with a closer similarity.

Although the vector distance calculation processing unit 263 calculates the vector distance using the featured data on Y (luminance signal), Cb and Cr (color signal) in the description above, it is also possible to perform the vector calculation using only Y (luminance signal) or only Cb and Cr (color signal). The classification result can be changed by changing the classifying method. For example, when it is desired to perform similarity-based classification with emphasis on the brightness feature rather than on the color feature, only Y (luminance signal) is used; when it is desired to perform similarity-based classification with emphasis on the color feature rather than on the brightness feature, only Cb and Cr (color signal) are used.

(2) Operation Flowchart

Figure 26:
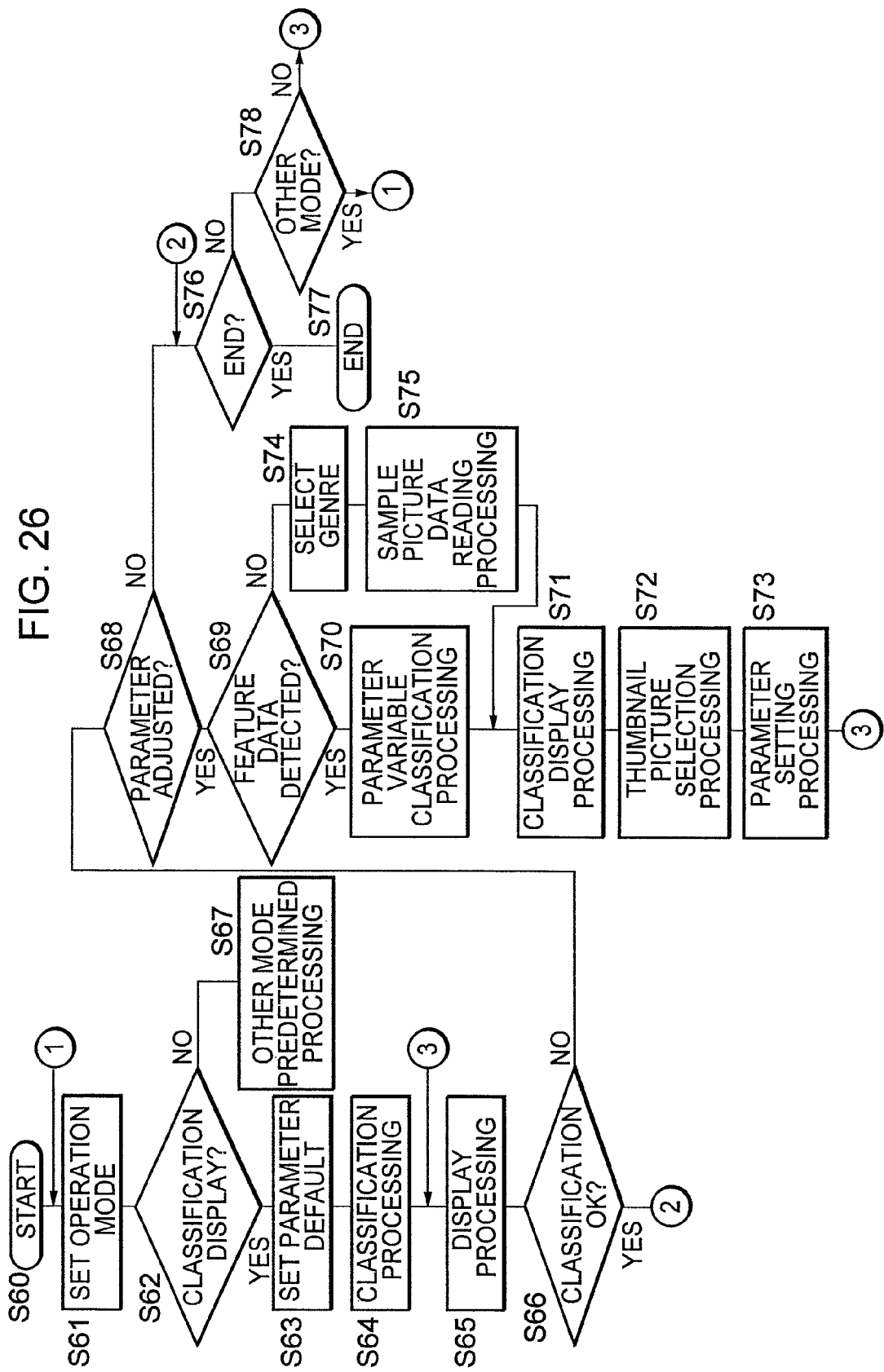
FIG. 26 is a flowchart showing the operation of classification in the fifth embodiment of the present invention.

FIG. 26 shows an example of the operation flowchart. The operation starts in step S60. The user sets the operation mode in step S61. If it is found that the mode is the image classification mode in step S62, the defaults of the parameters are set in step S63, and if it is found that the mode is not the image classification mode, control is passed to some other predetermined operation mode in step S67.

The default parameters that are set in step S63 are the initialization parameters of the apparatus or the last parameters that were set in the previous operation.

As described in the block configuration diagram, the parameters are those specifying the reprocessing method of the feature extract ion data reprocessing unit 260, the reception of the signals used in the calculation in the vector distance calculation processing unit 263, and the threshold value Th used in the ID generation processing unit 264.

The predetermined similar-image classifying processing is performed using the parameters that are set in step S64, and the result of the classifying processing is displayed in thumbnail format in step S65.

Whether the result of the classifying processing is the user desired result is checked in step S66. If the result is the user desired result, control is passed to step S76 to determine whether to end the operation. If the operation is ended, control is passed to step S77 to end the operation. If the operation is not ended, control is passed to step S78 to determine whether the mode is to be changed to some of the other mode. If the mode is not changed to some of the other mode, control is passed back to step S65 to continue the classification display. If the mode is changed to some of the other mode in step S78, control is passed back to step S61 to allow the user to select the operation mode.

If the user wants to change the classification result in step S66, control is passed to step S68 to determine whether to adjust parameters. If the user does not want to change the classification result, control is passed to step S76 to determine whether to end the operation. If the parameters are adjusted, control is passed to step S69 to determine whether the feature extraction data can be detected.

If the feature extraction data can be detected, the classifying processing can be performed using the image to be classified. Therefore, the parameters are variably adjusted in step S70 and the classifying processing is performed.

As described in the block configuration diagram, the variable adjustment of the parameters is the variable adjustment of the reprocessing method of the feature extraction data reprocessing unit 260, the variable adjustment of the reception of the signals used in the calculation in the vector distance calculation processing unit 263, and the variable adjustment of the threshold value. Th used in the ID generation processing unit 264.

If the feature extraction data cannot be detected, a classification genre is selected in step S74 and the classification sample picture data generated when some parameters are variably adjusted for the genre is read in step S75.

The classifying processing image is displayed in step S71, a desired classification picture is selected from the displayed thumbnail pictures in step S72, and the parameters corresponding to the selected thumbnail picture are set in step S73. After that, control is passed back to step S65 and the result is displayed.

The information signal processing apparatus and the information signal processing method in the first embodiment described above allow the user to set parameter data for playing back a digest according to the user's desired preference, thus allowing the user to perform a more efficient digest playback operation that satisfies the user's requirement. Because the adjustment is performed simply by playing back a predetermined video/audio file and specifying a file, the user can perform a complicated parameter change easily by performing only a simple operation.

In addition, the adjustment is performed by playing back the file corresponding to the adjustment parameters, the user can actually view how changed parameters affect the playback status. Therefore, the user can adjust the parameters easily and more efficiently. Because this parameter adjustment can also be performed according to a program genre, a more efficient adjustment that satisfies the user's requirement can be performed in a simple configuration.

The information signal processing system and the information signal processing method in the second embodiment described above allow the user to set parameter data for playing back a digest according to the user's desired preference, thus allowing the user to perform a more efficient digest playback operation that satisfies the user's requirement. When the parameter data for playing back a digest are adjusted, the user can confirm if the user desired digest playback can be performed using the data setting. Therefore, a more exact system can be configured efficiently.

In addition, because the adjustment confirmation data is not included in the apparatus, the configuration of the apparatus for the adjustment processing is simpler than that of an apparatus that has the equivalent function. Therefore, an efficient and effective system can be configured. Because this parameter adjustment can also be performed according to a program genre, a more efficient adjustment that satisfies the user's requirement can be performed in a simple configuration.

The information signal playback apparatus and the information signal playback method in the third embodiment described above allow the user to easily adjust parameters while visually and actually confirming which parameter adjustment out of a plurality of parameter adjustments will generate which scene during digest playback, thus making the adjustment efficient. Because the user can understand a change in the digest playback scene, generated by adjusting the parameters, on a time series basis and adjust the parameters while visually comparing a scene with the preceding or following scene, an effective and efficient parameter adjustment can be performed more easily. In addition, because the parameters can be adjusted for each user, an appropriate digest can be played back for each user more efficiently.

The information signal processing apparatus and the information signal processing method in the fourth embodiment described above allow the user to easily and efficiently adjust parameter data for playing back a digest via an operation unit such as a remote control. The user can easily adjust parameters by performing an operation such as a double-speed playback or a pause in the general operation mode without setting the mode to a complicated adjustment mode. Therefore, the user can play back a digest efficiently according to the user's requirement.

The information signal processing apparatus and the information signal processing method in the fifth embodiment described above allow the user to change the classification result of the image classification according to the user's preference by adjusting the parameters. To adjust parameters, the user is required only to select parameters by comparing the sample images, generated by variably adjusting parameters, without executing complicated operations.

In addition, when feature extraction data is not available at adjustment time, the sample images as well as the images to be actually classified can be displayed as a list for use in comparison when sample images area available. Therefore, the parameters for the classifying processing can be adjusted efficiently. Because this parameter adjustment can be performed for each image genre to be classified, efficient processing that can satisfies the user's preference can be performed.

This application claims priority from Japanese Priority Document No. 2003-296329, filed on Aug. 20, 2003 with the Japanese Patent Office, which document is hereby incorporated by reference.

What is claimed is:

1. An information signal processing system comprising;
   data playback means for playing back various types of data from a recording medium, on which featured data is recorded in a predetermined recording area on the recording medium and also video/audio data is recorded together with the predetermined featured data extracted from the predetermined video/audio data, or image data, or audio data according to a setting of a predetermined first parameter series,
   wherein the recording medium records predetermined video/audio information files to which a predetermined feature extraction processing and a predetermined playback period selection processing using featured data extracted by setting a predetermined second parameter series are carried out;
   operation mode setting means for setting a predetermined operation mode via a user's predetermined input;
   a predetermined network connection means;
   a network connection adjustment means for connecting to a predetermined site via the network connection means, downloading predetermined data, and performing predetermined parameter adjustment when the predetermined operation mode is set by the operation mode setting means;
   digest playback period processin.g means for determining, according to a predetermined rule, the predetermined digest playback period of the video/audio data recorded on the recording medium according to the featured data and either initialization parameter data that is set in advance in accordance with the first parameter series or parameter data adjusted by the network connection adjustment means, wherein the first parameter series is utilized in processing the predetermined featured data extracted from the predetermined video/audio data, image data, or audio-data and second parameter series is used for generating a play list based on the data extracted; and playback control means for performing predetermined playback control according to a signal from the digest playback period processing means.

2. The information signal processing system as cited in claim 1, wherein;

a predetermined test data is played back for a user to confirm adjusted condition when the predetermined parameter adjustment is performed by the network connection adjustment means.

3. The information signal processing system as cited in claim 1, further comprising:

setting data adjustment means for performing the adjustment without network connection by outputting information to a user via predetermined display means or information output means when the predetermined parameter adjustment cannot be performed by the network connection adjustment means.

4. The information signal processing system as cited in claim 1, wherein;

during at least one of the parameter adjustment via the network connection adjustment means and the parameter adjustment not via the network connection adjustment means, the predetermined parameter adjustment is performed according to a program genre if the video/audio data is broadcast program data or according to the predetermined attribute information signal of the video/audio data if the video/audio data is not broadcast program data.

5. An information signal processing method comprising:

a first step for playing back various types of data from a recording medium, on which featured data is recorded in a predetermined recording area on the recording medium and also video/audio data is recorded together with the predetermined featured data extracted from the predetermined video/audio data, or image data, or audio data according to a setting of a predetermined first parameter series;

wherein the recording medium records predetermined video/audio information flies to which a predetermined feature extraction processing and a predetermined playback period selection processing using featured data extracted by setting a predetermined second parameter series are carried out;

a second step for setting a predetermined operation mode via a user's predetermined input;

a third step for connecting to a predetermined site through predetermined network connection processing, downloading predetermined data, and performing predetermined parameter adjustment when the predetermined operation mode is set by the second step;

a fourth step for determining, according to a predetermined rule, the predetermined digest playback period of the video/audio data recorded on the recording medium according to the featured data and either initialization parameter data that is set in advance in accordance with the parameter series or parameter data adjusted through the network connection processing of the third step, wherein the firs parameter series is utilized in processing the predetermined featured data extracted from the predetermined video/audio data, image data or audio-data and second parameter series is used for generating play first based on the data extracted; and a fifth step for performing predetermined playback control according to the digest playback period processing of the fourth step.

6. The information signal processing method as cited in claim 5, wherein;

a predetermined test data is played back for a user to confirm adjustment contents when the predetermined parameter adjustment is performed through the network connection processing of the third step.

7. The information signal processing method as cited in claim 5, wherein;

said parameter adjustment can be performed without network connection by outputting information to a user through predetermined display or through information output when the predetermined parameter adjustment cannot be performed by the network connection processing of the third step.

8. The information signal processing method as cited in claim 5, wherein;

during at least one of the parameter adjustment through the network connection processing of the third step and the parameter adjustment not via the network connection processing, the predetermined parameter adjustment is performed according to a program genre if the video/audio data is broadcast program data or according to the predetermined attribute information signal of the video/audio data when the video/audio data is not broadcast program data.

9. An information signal processing apparatus comprising:

data playback means for playing back various types of data from a recording medium, on which featured data is recorded in a predetermined recording area on the recording medium and also video/audio data is recorded tighter with the predetermined featured data extracted from the predetermined video/audio data, or image data, or audio data according to predetermined first parameter series data;

digest playback period processing means for determining, according to a predetermined rule, the predetermined digest playback period of the video/audio data recorded on the recording medium according to the featured data and predetermined second parameter series data, wherein the first parameter series is utilized in processing the predetermined featured data extracted from the predetermined video/audio data, image data, or audio-data and the second parameter series is used for generating a play list based on the data extracted;

operation mode input means for receiving an operation mode allowing a user to perform a playback control operation in the predetermined operation mode when the video/audio data is played back;

playback control means for controlling the playback according to a signal from the operation mode input means; and data adjustment means for adjusting the first or second parameter series data according to the playback control status controlled by the playback control means.

10. The information signal processing apparatus as cited in claim 9, further comprising:

playback period storage means for storing a playback period when the predetermined playback control is perforated by the playback control means.

11. The information signal processing apparatus as cited in claim 9, wherein;
said data adjustment means adjusts the first or second parameter series data according to the predetermined featured data in the playback period when the predetermined playback control is performed by the playback control means.

12. The information signal processing apparatus as cited in claim 9, further comprising:
a recording medium on which test video/audio data of a predetermined time length is recorded wherein the first or second parameter series data can be adjusted using the test video/audio data after the adjustment by the data adjustment means.

13. An information signal processing method comprising:
a first step for playing back various types of data from a recording medium, on which featured data is recorded in a predetermined recording area on the recording medium and also video/audio data is recorded together with the predetermined featured data extracted from the predetermined video/audio data, or image data, or audio data according to a settig of a predetermined first parameter series;
a second step for determining, according to a predetermined rule, the predetermined digest playback period of the video/audio data recorded on the recording medium according to the featured data and predetermined second parameter series data;
a third step for receiving an operation mode allowing a user to perform a playback control operation in the predetermined operation mode selected by the user when the video/audio data is played back;
a fourth step for controlling the playback according to a signal of the operation mode received in the third step, wherein the first parameter series is utilized in processing the predetermined featured data extracted from the predetermined video/audio data, image data, or audio-data and the second parameter series is used for generating a play list based on the data extracted; and
a fifth step for adjusting the first or second parameter series data according to the playback control status controlled by the fourth step.

14. The information signal processing method as cited in claim 13, further comprising:
a step for storing a playback period when the predetermined playback control is performed by the fourth step.

15. The information signal processing method cited in claim 13, wherein;
said adjustment of the first or second parameter series data in the fifth step is performed by adjusting the first or second parameter series data according to the predetermined featured data in the playback period when the predetermined playback control is performed through the playback control by the fourth step.

16. The information signal processing method as cited in claim 13, further comprising:
a step for storing predetermined test video/audio data of a predetermined time length in a predetermined method wherein the first or second parameter series data can he adjusted using the test video/audio data after the adjustment in the fifth step.

* * * * *